United States Patent

Corpart et al.

[11] Patent Number: 6,153,705
[45] Date of Patent: Nov. 28, 2000

[54] METHOD FOR BLOCK POLYMER SYNTHESIS BY CONTROLLED RADICAL POLYMERISATION

[75] Inventors: Pascale Corpart, Sannois; Dominique Charmot, Le Pre Saint Gervais; Samir Z. Zard, Gif-sur-Yvette; Thibaud Biadatti, Opio; Daniel Michelet, Nice, all of France

[73] Assignee: Rhodia Chimie, Courbevoie, France

[21] Appl. No.: 09/214,880

[22] PCT Filed: Jun. 23, 1998

[86] PCT No.: PCT/FR98/01316

§ 371 Date: Jan. 14, 1999

§ 102(e) Date: Jan. 14, 1999

[87] PCT Pub. No.: WO98/58974

PCT Pub. Date: Dec. 30, 1998

[30] Foreign Application Priority Data

Jun. 23, 1997 [FR] France .................... 97 07764

[51] Int. Cl.[7] .................. C08F 293/00; C08F 2/38; C07C 329/16
[52] U.S. Cl. .................. 525/244; 525/308; 525/309; 525/314
[58] Field of Search .................. 525/314, 244, 525/308, 309

[56] References Cited

U.S. PATENT DOCUMENTS 2,396,997  3/1946  Fryling .

FOREIGN PATENT DOCUMENTS 0 348 166 A2  12/1989  European Pat. Off. .

*Primary Examiner*—Mark L. Warzel
*Attorney, Agent, or Firm*—Jean-Louis Seugnet

[57] ABSTRACT

The invention relates to a process for polymerizing block polymers of general formula (I):

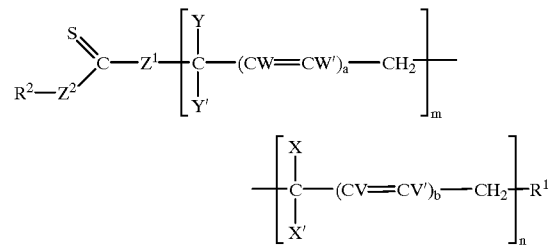

in which process the following are brought into contact with each other:

an ethylenically unsaturated monomer of formula:

$CYY'(=CW—CW')_a=CH_2$, a precursor compoun of general formula (II):

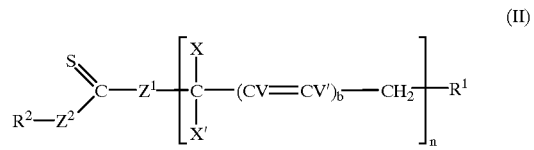

a radical polymerization initiator.

30 Claims, No Drawings

METHOD FOR BLOCK POLYMER SYNTHESIS BY CONTROLLED RADICAL POLYMERISATION

This application is an application under 35 U.S.C. Section 371 of International Application Number PCT/FR98/01316, filed on Jun. 23, 1998.

The present invention relates to a novel radical polymerization process for obtaining block copolymers.

Block polymers are usually prepared by ionic polymerization. This type of polymerization has the drawback of only allowing the polymerization of certain types of nonpolar monomers, especially styrene and butadiene, and of requiring a particularly pure reaction mixture and temperatures which are often below room temperature so as to minimize parasitic reactions, and hence of severe operational constraints.

Radical polymerization has the advantage of being easily carried out without having to comply with excessive purity conditions, and at temperatures greater than or equal to room temperature. However, until recently a radical polymerization process allowing block polymers to be obtained did not exist.

Since then, a new radical polymerization process has been developed, namely "controlled" or "living" radical polymerization. Controlled radical polymerization takes place by the growth, by propagation, of macroradicals. These macroradicals, which have a very short lifetime, recombine irreversibly by coupling or dismutation. When the polymerization takes place in the presence of several comonomers, the compositional variation of the mixture is infinitely slow compared with the lifetime of the macroradical so that the chains have a sequence of random monomer units and not a block-type sequence.

Recently, controlled radical polymerization techniques have been developed in which the ends of polymer chains may be reactivated in the form of a radical by homolytic bond (for example, C—O or C-halogen) scission.

Controlled radical polymerization therefore has the following distinct characteristics:

1. the number of chains is fixed throughout the duration of the reaction,
2. the chains all grow at the same rate, resulting in:
    a linear increase in the molecular masses with conversion,
    a narrow distribution of masses,
3. the average molecular mass is controlled by the monomer/chain-precursor molar ratio, and
4. the possibility of preparing block copolymers.

The controlled character is even more pronounced when the rate of reactivation of the chains into radicals is very much greater than the rate of growth of the chains (propagation). There are cases where this is not always true (i.e. the rate of reactivation of the chains into radicals is greater than or equal to the propagation rate) and conditions 1 and 2 are not observed, nevertheless it is always possible to prepare block copolymers.

Several approaches have been described for controlling radical polymerization. The most commonly cited consists in introducing, into the mixture, counter radicals which combine reversibly with the growing macroradicals, such as, for example, nitroxyl radicals (Georges et al., *Macromolecules*, 26, 2987, (1993)). This technique is characterized by high temperatures for labilizing the C—O bond.

Another method, called Atom Transfer Radical Polymerization, makes use of transition metal salts combined with organic ligands and an initiator generally consisting of an organic halide; control of the polymerization is made possible by the reversibility of the C-halogen bond (K. Matyjaszewski, PCT WO 96/30421). One drawback with this polymerization is that a stoichiometric quantity of metal per chain remains.

Otsu (Otsu et al., *Makromol. Chem. Rapid Comm.*, 3, 127–132, (1982), Otsu et al. ibid, 3, 123–140, (1982), Otsu et al., *Polymer Bull.*, 7, 45, (1984), ibid, 11, 135, (1984), Otsu et al, *J. Macromol. Sci. Chem.*, A21, 961, (1984) and Otsu et al., *Macromolecules*, 19, 2087, (1989)) has shown that certain organic sulphides, particularly dithiocarbamates, allowed chains to be grown in a controlled manner under UV irradiation, according to the principle:

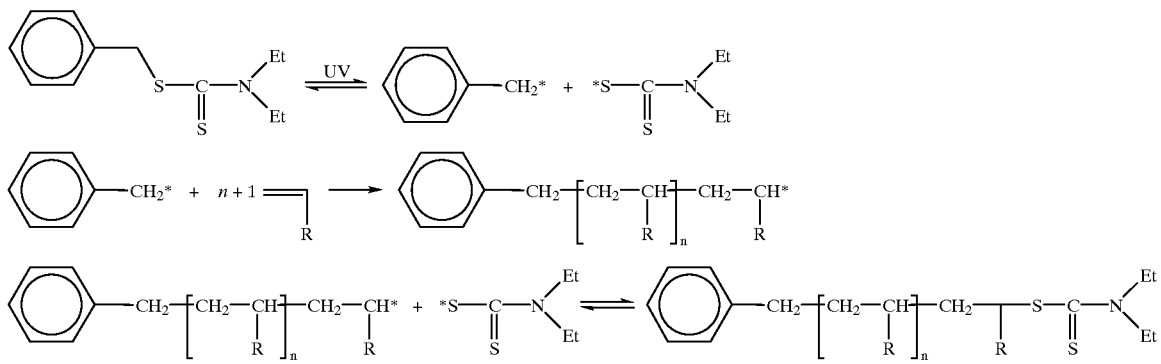

The principle relies on the photolysis of the C—S bond, which regenerates the carbon macroradical, on the one hand, and the dithiocarbamyl radical, on the other hand. The controlled character of the reaction is due to the reversibility of the C—S bond under UV irradiation. It is thus possible to obtain block copolymers. On the other hand, the equilibrium constant of reaction 1 above is not very large compared with the rate of propagation, this having the consequence of generating relatively broad molecular mass distributions. Thus, the dispersion index ($DI=M_w/M_n$) is between 2 and 5 (Otsu et al., 25, 7/8, 643–650, (1989)).

Xanthate disulphides and dithiocarbamate disulphides are themselves well known as transfer agents in conventional radical polymerization in thermal mode and in the presence of an initiator, but no one has hitherto been able to control the polymerization, or even less to produce block copolymers.

Up till now it was known that disulphides (tetraalkylthiuram disulphide, diisopropylxanthate disulphide and mercaptobenzothiazol disulphide) were activatable thermally or under UV irradiation, whereas monosulphides (substituted xanthates, dithiocarbamates) were activatable only under UV irradiation (Roha et al., *Macromol. Symp.*, 91, 81–92, (1995), and Okawara et al., Bull. of the Tokyo Inst. of Techn., No. 78, 1966).

However, controlled radical polymerization making use of a UV irradiation source is very difficult to carry out, especially from an industrial standpoint, since the penetration of the UV photons into the polymerization medium is limited, both by absorption phenomena (most of the ethylenic monomers absorb in the 210–280 nm range) and by diffusion phenomena in disperse media (suspension, emulsion).

Moreover, it has been shown (Turner et al., *Macromolecules*, 23, 1856–1859, (1990)) that photopolymerization in the presence of dithiocarbamate generates carbon disulphide and may be accompanied by a loss of polymerization control.

For these reasons, it has thus been sought to develop a technique which can be used to obtain block copolymers by a process without UV irradiation, preferably by thermal initiation.

Until the present time, no controlled radical polymerization system has been able to be demonstrated using dithio compounds in the absence of a UV source.

Controlled radical polymerization has an advantage over conventional radical polymerization when it is a question of preparing low-molecular-weight functionalized chains (reactive telomers). Such polymers are desirable for specific applications such as, for example, coatings and adhesives.

Thus, when it is attempted to synthesize chains grafted with, on average, 2 functional comonomers, the fraction of chains with at most one functional site becomes large when the average degree of polymerization is less than a threshold value (e.g. 20 or 30). Controlled radical polymerization makes it possible to reduce, or even to inhibit, the formation of these oligomers having zero or one functional site which degrade the performance in terms of application.

One object of the present invention is to provide a novel controlled radical polymerization process for the synthesis of block polymers.

Another object of the present invention is to provide a controlled radical polymerization process for the synthesis of block polymers in the absence of a UV source.

Another object is to provide a controlled radical polymerization process for the synthesis of block polymers from all types of monomers.

Another object is to provide a controlled radical polymerization process for the synthesis of block polymers containing no metal impurities deleterious to their use.

Another object is to provide a controlled radical polymerization process for the synthesis of block copolymers, the said polymers being chain-end functionalized.

Another object is to provide a controlled radical polymerization process for the synthesis of block polymers and block copolymers having a low polydispersity index.

Another object is to provide a controlled radical polymerization process for the synthesis of oligomers in which the number of functional units is constant from chain to chain.

To this end, the invention relates to a process for polymerizing block polymers of general formula (I):

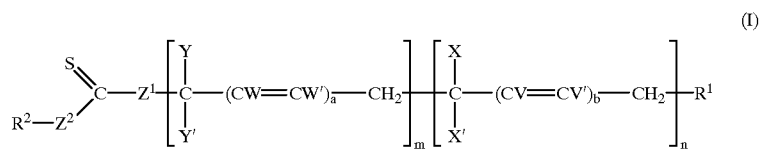

in which process, the following are brought into contact with each other:

an ethylenically unsaturated monomer of formula:

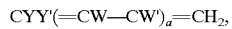

a precursor compound of general formula (II):

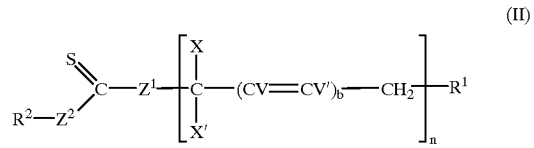

a radical polymerization initiator.

The invention also relates to the block polymers which can be obtained by the above process.

Finally, the invention relates to polymers of general formula (II), the polydispersity index of which is at most 2.

Further details and advantages of the invention will appear more clearly on reading the description and the examples.

The invention therefore relates first of all to a process for polymerizing block polymers of general formula (I):

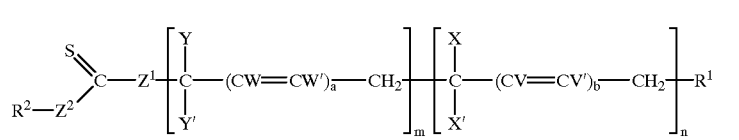

in which:

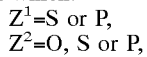

$Z^2$=O, S or P, $R^1$ and $R^2$, which are identical or different, represent:
an optionally substituted alkyl, acyl, aryl, alkene or alkyne group (i), or
an optionally substituted, saturated or unsaturated, carbon-containing or aromatic ring (ii), or
an optionally substituted, saturated or unsaturated heterocycle (iii),
it being possible for these groups and rings (i), (ii) and (iii) to be substituted with substituted phenyl groups, substituted aromatic groups, or groups: alkoxycarbonyl or aryloxycarbonyl (—COOR), carboxy (—COOH), acyloxy (—$O_2$CR), carbamoyl (—CON$R_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—N$R_2$), halogen, allyl, epoxy, alkoxy (—OR), S-alkyl, S-aryl, groups having a hydrophilic or ionic character, such as the alkali metal salts of carboxylic acids, the alkali metal salts of sulphonic acid, polyalkylene oxide chains (PEO, PPO), cationic substituents (quaternary ammonium salts), R representing an alkyl or aryl group,
a polymer chain,
V, V', W and W', which are identical or different, represent: H, an alkyl group or a halogen,
X, X', Y and Y', which are identical or different, represent H, a halogen or an $R^3$, $OR^3$, $OCOR^3$, NHCOH, OH, $NH_2$, $NHR^3$, $N(R^3)_2$, $(R^3)_2N^+O^-$, $NHCOR^3$, $CO_2H$, $CO_2R^3$, CN, $CONH_2$, $CONHR^3$ or $CONR^3_2$ group, in which $R^3$ is chosen from alkyl, aryl, aralkyl, alkaryl, alkene or organosilyl groups, optionally perfluorinated and optionally substituted with one or more carboxyl, epoxy, hydroxyl, alkoxy, amino, halogen or sulphonic groups,
a and b, which are identical or different, are equal to 0 or 1,
m and n, which are identical or different, are greater than or equal to 1 and, when one or other is greater than 1, the individual repeat units are identical or different,
in which process the following are brought into contact with each other:
an ethylenically unsaturated monomer of formula:

$$CYY'(=CW-CW')_a=CH_2,$$

a precursor compound of general formula (II):

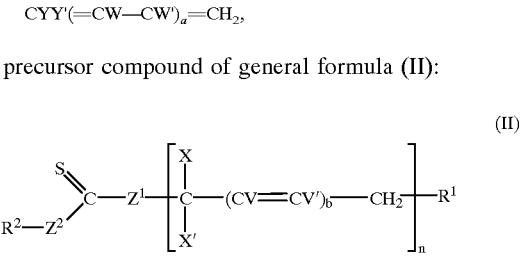

a radical polymerization initiator.

The process therefore consists in bringing into contact with each other a radical polymerization initiator, an ethylenically unsaturated monomer and a precursor of general formula (II).

The radical polymerization initiator may be chosen from the initiators conventionally used in radical polymerization. These may, for example, be one of the following initiators:

hydrogen peroxides such as: tert-butyl hydroperoxide, cumene hydroperoxide, tert-butyl peroxyacetate, tert-butyl peroxybenzoate, tert-butyl peroxyoctoate, tert-butyl peroxyneodecanoate, tert-butyl peroxyisobutyrate, lauroyl peroxide, tert-amyl peroxypivalate, tert-butyl peroxypivalate, dicumyl peroxide, benzoyl peroxide, potassium persulphate and ammonium persulphate;

azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(tert-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2-2'-azobis(N,N'-dimethyleneisobutyramidine)dichloride, 2,2'-azobis(2-amidinopropane)dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide] and 2,2'-azobis(isobutyramide)dihydrate;

redox systems including combinations such as:

mixtures of hydrogen peroxide or alkyl peroxide, peresters, percarbonates and the like and of any one of the salts of iron, titanous salts, zinc formaldehyde sulphoxylate or sodium formaldehyde sulphoxylate, and reducing sugars;

alkali-metal or ammonium persulphates, perborates or perchlorates in combination with an alkali metal bisulphite, such as sodium metabisulphite, and reducing sugars;

alkali-metal persulphates in combination with an arylphosphinic acid, such as benzenephosphonic acid and other similar acids, and reducing sugars.

The amount of initiator to be used is determined so that the amount of radicals generated is at most 20 mol % with respect to the amount of compound (II), preferably at most 5 mol %.

As ethylenically unsaturated monomer, the monomers chosen from styrene or its derivatives, butadiene, chloroprene, (meth)acrylic esters, vinyl esters and vinyl nitriles are more specifically used according to the invention.

Butadiene and chloroprene correspond to the case in which a and b=1 in the formulae (I), (II) and in the formula for the monomer given above.

"(Meth)acrylic esters" should be understood to mean esters of acrylic acid and of methacrylic acid with hydrogenated or fluorinated $C_1$–$C_{12}$, preferably $C_1$–$C_8$, alcohols. Among compounds of this type, mention may be made of: methyl acrylate, ethyl acrylate, propyl acrylate, n-butyl acrylate, isobutyl acrylate, 2-ethylhexyl acrylate, tert-butyl acrylate, methyl methacrylate, ethyl methacrylate, n-butyl methacrylate and isobutyl methacrylate.

The vinyl nitriles include more particularly those having from 3 to 12 carbon atoms, such as, in particular, acrylonitrile and methacrylonitrile.

It should be noted that styrene may be replaced, completely or partly, by derivatives such as alpha-methylstyrene or vinyltoluene.

The other ethylenically unsaturated monomers which can be used, alone or as mixtures, or which can be copolymerized with the above monomers, are, for example:

vinyl esters of carboxylic acids, such as vinyl acetate, vinyl versatate and vinyl propionate;

vinyl halides;

ethylenically unsaturated monocarboxylic and dicarboxylic acids, such as acrylic acid, methacrylic acid, itaconic acid, maleic acid and fumaric acid, and monoalkyl esters of dicarboxylic acids of the type mentioned with alkanols preferably having from 1 to 4 carbon atoms and their N-substituted derivatives;

amides of unsaturated carboxylic acids, such as acrylamide, methacrylamide, N-methylolacrylamide or methacrylamide, and N-alkylacrylamides;

ethylenic monomers containing a sulphonic acid group and its ammonium or alkali metal salts, for example vinylsulphonic acid, vinylbenzenesulphonic acid, alpha-acrylamidomethylpropanesulphonic acid and 2-sulphoethylene methacrylate;

amides of vinylamine, especially vinylformamide or vinylacetamide; and unsaturated ethylenic monomers containing a secondary, tertiary or quaternary amino group, or a heterocyclic group containing nitrogen, such as, for example, vinylpyridines, vinylimidazole, aminoalkyl (meth)acrylates and aminoalkyl (meth)acrylamides such as dimethylaminoethyl acrylate or methacrylate, di-tert-butylaminoethyl acrylate or methacrylate and dimethylaminoacrylamide or dimethylaminomethacrylamide. Likewise, it is possible to use zwitterionic monomers such as, for example, sulphopropyl (dimethyl)aminopropyl acrylate.

In order to prepare the copolymers of formula (I) for which Y=H and Y'=NH$_2$, it is preferred to use as ethylenically unsaturated monomers the amides of vinylamine, for example vinylformamide or vinylacetamide. The copolymer obtained is then hydrolysed to acid or basic pH.

In order to prepare the copolymers of formula (I) for which Y=H and Y'=OH, it is preferred to use as ethylenically unsaturated monomers vinyl esters of carboxylic acid such as, for example, vinyl acetate. The copolymer obtained is then hydrolysed to acid or basic pH.

The types and amounts of copolymerizable monomers employed according to the present invention vary depending on the particular final application for which the block polymer is intended. These variations are well known and may be easily determined by those skilled in the art.

In order for the polymer of general formula (I) to be a block polymer, the "precursor" compound of general formula (II) must be a polymer.

Thus, n is greater than or equal to 1, preferably greater than or equal to 6. The monomer units of this polymer may be identical or different.

According to the preferred embodiment of the invention, in the formula (II) for the precursor compounds, $Z^1$ is a sulphur atom and $Z^2$ is an oxygen atom; these compounds are therefore chain-end functionalized by alkyl xanthates.

Preferably, in the formula (II) for the precursor compounds, $R^1$ represents:

a group of formula $CR'^1R'^2R'^3$ in which:
  $R'^1$, $R'^2$ and $R'^3$ represent groups (i), (ii) or (iii) as defined above or
  $R'^1=R'^2=H$ and $R'^3$ is an aryl, alkene or alkyne group,
or a —$COR'^4$ group in which $R'^4$ represents a group (i), (ii) or (iii) as defined above.

Likewise, in the formula (II) for the precursor compounds, $R^2$ preferably represents a group of formula: —$CH_2R'^5$, in which $R'^5$ represents H or a group (i), (ii) or (iii) with the exception of aryl, alkyne and alkene groups.

The most interesting results have been obtained for compounds of formula (II) when $Z^1$ is a sulphur atom, $Z^2$ is an oxygen atom, $R^2$ is an ethyl or phenyl group and $R^1$ is a group chosen from:

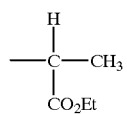

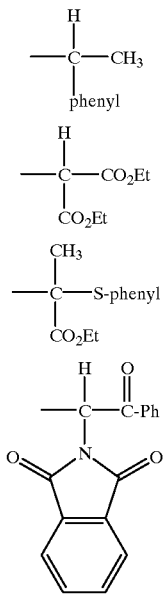

The $R^1$ group may also represent a polymer chain coming from a radical or ionic polymerization or coming from a polycondensation.

The compounds (II) particularly preferred are styrene (Y'=H, Y=C$_6$H$_5$, b=0), methyl acrylate (Y'=H, Y=COOMe, b=0), ethyl acrylate (Y'=H, Y=COOEt, b=0), butyl acrylate (Y'=H, Y=COOBu, b=0), tert-butyl acrylate (Y'=H, Y=COOtBu, b=0), vinyl acetate (Y'=H, Y=OCOMe, b=0) and acrylic acid (Y'=H, Y=COOH, b=0) homopolymers, for which:

$Z^1$=S, $Z^2$=O, $R^1$=CHCH$_3$(CO$_2$Et) and $R^2$=Et, or
$Z^1$=S, $Z^2$=O, $R^1$=CH(CO$_2$Et)$_2$ and $R^2$=Et.

This precursor polymer (II) may come from the radical polymerization of an ethylenically unsaturated monomer of formula: CXX'(=CV—CV')$_b$=CH$_2$ by bringing the said monomer into contact with a radical polymerization initiator and a compound of general formula (III), (IV) or (V):

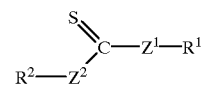
(III)

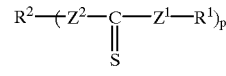
(IV)

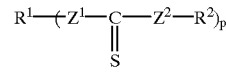
(V)

p being between 2 and 10, preferably between 2 and 5.

In this synthesis, the radical polymerization initiators and the ethylenically unsaturated monomers are of the type previously mentioned.

With regard to the compounds of general formulae (III), (IV) or (V), the symbols $R^2$, $Z^2$, $R^1$ and $Z^1$ have the same meaning as previously. As regards their symbols, the preferred ones are the same as previously.

Thus, the preferred compounds of general formula (III) are ethyl α-(O-ethylxanthyl)propionate ($Z^1$=S, $Z^2$=O, $R^1$=CHCH$_3$(CO$_2$Et), $R^2$=Et) and ethyl (O-ethylxanthyl) malonate ($Z^1$=S, $Z^2$=O, $R^1$=CH(CO$_2$Et)$_2$, $R^2$=Et).

Among compounds of formula (IV), those for which $R^2$ is the $-(CH_2)_q-$ group or a polyether group $-(CHR-CH_2-O)_q-CHR-CH_2-$, with q between 2 and 10, are preferred.

Among the compounds of formula (V), those for which $R^1$ is the group $-CH_2$-phenyl-$CH_2-$ or the group $-CHCH_3CO_2CH_2CH_2CO_2CHCH_3-$ are preferred.

The compounds of formulae (III), (IV) and (V) are readily accessible. Those for which $Z^1$ is a sulphur atom and a $Z^2$ is an oxygen atom, called alkyl xanthates, may in particular be obtained by reaction between a xanthate salt, such as an alkali metal salt of the type:

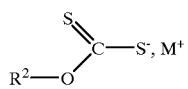

and a halogenated derivative of the type: Hal-$R^1$, with Hal chosen from Cl, Br or I.

The compounds of formulae (III), (IV) and (V), in which $Z^1$ is S, may also be obtained by the process in which the following are mixed and heated:

a disulphide (S) compound of formula (A):

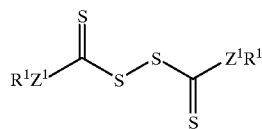

and a diazo (N) compound of formula (B):

$R^2Z^2-N=N-Z^2R^2$

The complete process of synthesizing a block polymer of formula (I) according to the invention may therefore consist in:

(1) synthesizing a polymer by bringing into contact with each other an ethylenically unsaturated monomer of formula $(CXX'(=CV-CV')_b=CH_2$, a radical polymerization initiator and a compound of formula (III), (IV) or (V), and (2) using the polymer obtained at step 1 as precursor of general formula (II) in order to prepare a diblock polymer by bringing it into contact with a new ethylenically unsaturated monomer of formula: $CYY'(=CW-CW')_a=CH_2$ and a radical polymerization initiator.

This step (2) may be repeated as many times as desired using new monomers to synthesize new blocks and to obtain a multiblock polymer.

As indicated previously, for the preparation of precursors of formula (II) for which X=H and X'=$NH_2$ (step (1) defined above), it is preferred to use, as ethylenically unsaturated monomers, amides of vinylamine, for example vinylformamide or vinylacetamide. The polymer obtained is then hydrolysed to acid or basic pH.

Likewise, for the preparation of precursors of formula (II) for which X=H and X'=OH, it is preferred to use vinyl esters of carboxylic acids, such as vinyl acetate for example, as ethylenically unsaturated monomers. The polymer obtained is then hydrolysed to acid or basic pH.

Without thereby excluding any other reaction scheme, the presumed action mechanism of the polymerization is illustrated below in the case of a xanthate-type precursor compound of formula (II).

1. Initiation of the polymerization:

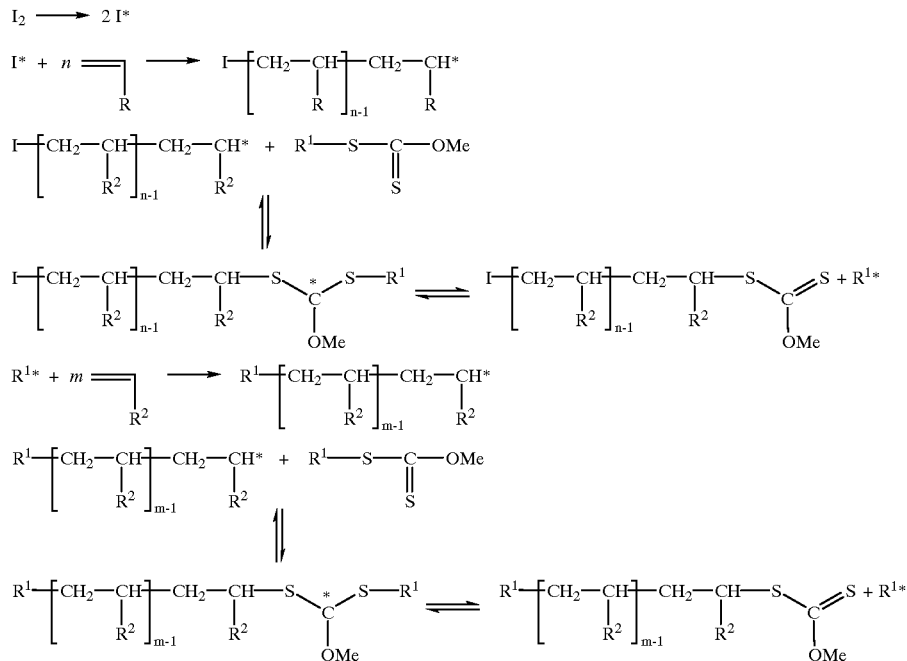

2. Chain growth

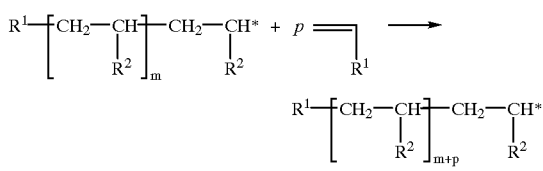

3. Degenerative chain transfer

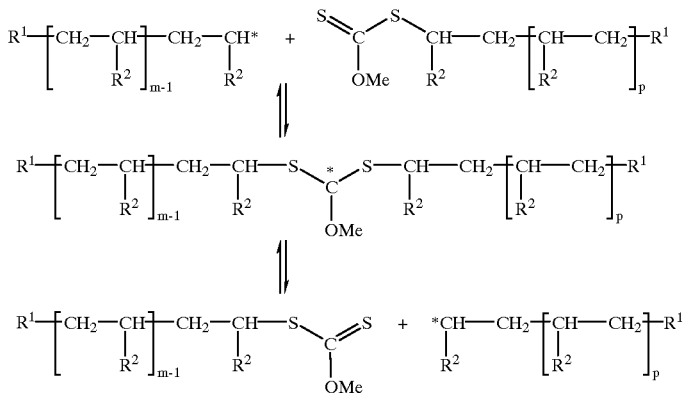

The degenerative chain transfer reaction makes it possible to react a "dormant" chain carrying the xanthate unit at its end into a macroradical. This unit may grow by propagation and again be added onto a xanthate chain end, and fragment. When the xanthate exchange rate is at least as great as the propagation rate the chains will then grow according to a controlled process. When the $CH_2$=$CHR^2$ monomer is completely consumed, a second monomer of a different type, $CH_2$=$CHR^3$, is introduced into the mixture and then block copolymers of general formula (I) are obtained:

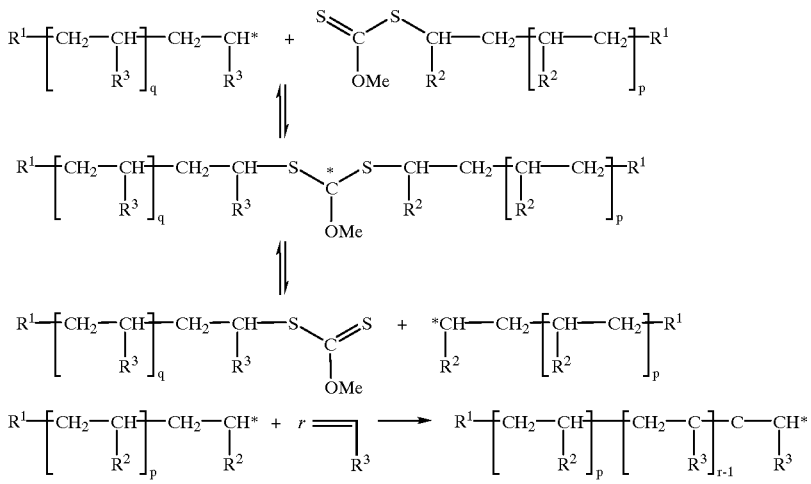

According to this principle, the invention therefore also relates to a process for preparing multiblock polymers, in which the implementation of the process previously described is repeated at least once, using:

different monomers from those of the previous implementation, and instead of the precursor compound of formula (II), the block polymer coming from the previous implementation.

If the implementation is repeated once, a triblock polymer will be obtained, if it is repeated twice, a "quadriblock" polymer will be obtained, and so on. In this way, at each new implementation, the product obtained is a block polymer having an additional polymer block.

Therefore, in order to prepare multiblock polymers, the process consists in repeating, several times, the implementation of the preceding process on the block polymer coming from each previous implementation using different monomers.

According to this method of preparing multiblock polymers, when it is desired to obtain homogeneous block polymers without a composition gradient, and if all the successive polymerizations are carried out in the same reactor, it is essential for all the monomers used in one step to have been consumed before the polymerization of the next step starts, therefore before the new monomers are introduced.

The compounds of formula (IV) and (V) are particularly advantageous as they allow a polymer chain to be grown on at least two active sites. With this type of compound, it is possible to save on polymerization steps in order to obtain an n-block copolymer.

Thus, if p=2 in the formula (IV) or (V), the first block is obtained by the polymerization of a monomer M1 in the presence of the compound of formula (IV) or (V). This first block may then grow at each of its ends by the polymerization of a second monomer M2. A triblock copolymer is obtained, it being possible for this triblock polymer itself to grow at each of its ends by the polymerization of a third monomer M3. Thus, a "pentablock" copolymer is obtained in only three steps.

If p is greater than 2, the process makes it possible to obtain homopolymers or block copolymers whose structure is "multi-branched" or "hyperbranched".

The polymerization may be carried out in bulk, in solution or in emulsion. Preferably, it is carried out in emulsion.

Preferably, the process is carried out semi-continuously.

The temperature may vary between ambient temperature and 150° C., depending on the nature of the monomers used.

In general, during the polymerization, the instantaneous polymer content with respect to the instantaneous amount of monomer and polymer is between 50 and 99% by weight, preferably between 75 and 99%, even more preferably between 90 and 99%. Polymer is understood to mean either the compound of formula (I) for synthesizing a block copolymer or the compound of formula (II) for synthesizing the precursor polymer. This content is maintained, in a known manner, by controlling the temperature, the rate of addition of the reactants and of the polymerization initiator.

The process is carried out in the absence of a UV source.

The process according to the invention has the advantage of resulting in block polymers having a low polydispersity index.

It also makes it possible to control the molecular mass of the polymers.

The invention therefore also relates to the block polymers which can be obtained by the above process.

In general, these polymers have a polydispersity index of at most 2, preferably of at most 1.5.

These results are especially obtained for block polymers of formula (I) which are chain-end functionalized by the alkyl xanthate group.

These polymers correspond to the polymers of general formula (I) for which $Z^1$ is a sulphur atom and $Z^2$ is an oxygen atom.

The preferred block polymers are those having at least two polymer blocks chosen from the following combinations:

polystyrene/polymethyl acrylate
polystyrene/polyethyl acrylate,
polystyrene/poly(tert-butyl acrylate),
polyethyl acrylate/polyvinyl acetate,
polybutyl acrylate/polyvinyl acetate,
polyethyl acrylate/poly(tert-butyl acrylate),
poly(tert-butyl acrylate)/polyvinyl acetate,
polyethyl acrylate/polybutyl acrylate,
polybutyl acrylate/polyvinyl alcohol,
polyacrylic acid/polyvinyl alcohol.

According to a preferred mode, the polymers have at least two polymer blocks chosen from the above combinations and are of general formula (I) in which:

$Z^1=S$, $Z^2=O$, $R^1=CHCH_3(CO_2Et)$ and $R^2=Et$, or
$Z^1=S$, $Z^2=O$, $R^1=CH(CO_2Et)_2$ and $R^2=Et$.

Finally, the process for synthesizing the precursor polymers of general formula (II) also makes it possible to synthesize polymers having a low polydispersity index. In general, these precursor polymers have a polydispersity index of at most 2, preferably of at most 1.5, especially when these polymers are alkyl-xanthate functionalized polymers ($Z^1$ being a sulphur atom and $Z^2$ being an oxygen atom).

Preferably, n is greater than or equal to 6.

The compounds (II) particularly preferred are styrene (Y'=H, Y=$C_6H_5$, b=0), methyl acrylate (Y'=H, Y=COOMe, b=0), ethyl acrylate (Y'=H, Y=COOEt, b=0), butyl acrylate (Y'=H, Y=COOBu, b=0), tert-butyl acrylate (Y'=H, Y=COOtBu, b=0), vinyl acetate (Y'=H, Y=OCOMe, b=0) and acrylic acid (Y'=H, Y=COOH, b=0) homopolymers, for which:

$Z^1=S$, $Z^2=O$, $R^1=CHCH_3(CO_2Et)$ and $R^2=Et$, or
$Z^1=S$, $Z^2=O$, $R^1=CH(CO_2Et)_2$ and $R^2=Et$.

The following examples illustrate the invention without, however, limiting the scope thereof.

EXAMPLES

1. Synthesis of (Alkyl Xanthate) Precursors of Formula (III)

Example 1.1

Synthesis of the Ethyl α-(O-ethylxanthyl) propionate Precursor

Approximately 1 liter of ethanol and 80 ml of ethyl α-bromopropionate are introduced into a round-bottomed flask. The flask is immersed in an ice bath. Homogenization takes place with stirring and under a flow of nitrogen. When the temperature of the reaction mixture has stabilized, 109 g of potassium O-ethylxanthate are added. The stirring and nitrogen stream are maintained for approximately 4 hours during which the mixture becomes whitish because of the formation of KBr.

When the reaction has reached completion, approximately 1 liter of water is added to the reactor. The mixture becomes clear and yellow. The desired product is extracted from the water-alcohol phase by means of an ether/pentane (1/2) mixture and recovered by vacuum evaporation.

The $^{13}C$ NMR spectrum gives the following peaks: 171.21; 70.11; 61.62; 47.01; 16.82; 14.04; 13.60.

Example 1.2

Synthesis of the [1-(O-ethylxanthyl)ethyl]benzene Precursor 1 liter of ethanol and 80 ml of (1-bromoethyl)benzene are introduced into a round-bottomed flask. The flask is immersed in an ice bath. Homogenization takes place with stirring and under a stream of nitrogen. When the temperature of the reaction mixture has stabilized, 104 g of potassium O-ethylxanthate are added. The stirring and stream of nitrogen are maintained for approximately 4 hours during which the medium becomes whitish because of the formation of KBr.

When the reaction has reached completion, approximately 1 liter of water is added to the reactor. The mixture becomes clear and yellow. The desired product is extracted from the water-alcohol phase by means of an ether/pentane (1/2) mixture and recovered by vacuum evaporation.

The $^{13}C$ NMR spectrum gives the following peaks: 213.25; 141.73; 128.57; 127.47; 126.49; 69.69; 49.21; 21.70; 13.71.

Example 1.3

Synthesis of the α,α'-di(O-ethylxanthyl)-p-xylene Precursor

Approximately 1 liter of ethanol and 80 ml of α,α'-dichloro-p-xylene are introduced into a round-bottomed flask. The flask is immersed in an ice bath. Homogenization takes place with stirring and under a stream of nitrogen. When the temperature of the reaction medium has stabilized, 184 g of potassium O-ethylxanthate are added. The stirring and stream of nitrogen are maintained for approximately 4 hours during which the medium becomes whitish because of the formation of KCl.

When the reaction has reached completion, approximately 1 liter of water is added to the reactor. The mixture becomes clear and yellow. The desired product is extracted from the water-alcohol phase by means of a dichloromethane/ether/pentane (1/1/2) mixture and recovered by vacuum evaporation.

The $^{13}$C NMR spectrum gives the following peaks: 135.27; 129.42; 70.23; 40.12; 13.89.

Example 1.4

Synthesis of the α-(O-ethylxanthyl)-α-phthalimidoacetophenone Precursor 74 ml of acetone and 12.7 g of α-bromo-α-phthalimidoacetophenone are introduced into a round-bottomed flask. The mixture is homogenized with stirring and under a stream of nitrogen. 6.5 g of potassium O-ethylxanthate salt are added. The reaction lasts 5 min, after which the reaction mixture is diluted with distilled water.

The precipitated solid is filtered, dried and purified by recrystallization in ethanol.

The $^{13}$C NMR spectrum gives the following peaks: 210.0; 189.2; 166.2; 134.4; 133.8; 133.6; 131.5; 128.7; 128.4; 123.7; 71.6; 61.8; 13.6.

Example 1.5

Synthesis of the Ethyl α-(O-ethylxanthyl)-α-phenylthiopropionate Precursor 11 ml of acetone and 2.36 g of potassium O-ethylxanthate salt are introduced into a round-bottomed flask. The mixture is homogenized with stirring and under a stream of nitrogen, and then a solution of ethyl α-chloro-α-phenolthiopropionate (1.56 g) in acetone (4 ml) is added drop by drop. The mixture is stirred for 30 min. The solvent is evaporated. The residue is diluted with ether and then washed in water.

The organic phase is separated and dried on sodium sulphate. The product is recovered after concentration in vacuo and purification by chromatography on silica.

The $^{13}$C NMR spectrum gives the following peaks: 211.3; 168.8; 137.6; 130.4; 129.0; 128.9; 69.72; 62.99; 62.13; 25.56; 13.80; 13.37.

Example 1.6

Synthesis of the Ethyl (O-ethylxanthyl)malonate Precursor 50 ml of acetone and 4 ml of diethylchloromalonate are introduced into a round-bottomed flask. The mixture is homogenized with stirring and under a stream of nitrogen and 4.4 g of potassium O-ethylxanthate salt is added. The reaction lasts 1 hour, after which the reaction medium is diluted with 20 ml of water.

The product is extracted from the phase thus obtained by 50 ml of ether, and then purified by flash chromatography.

The $^{13}$C NMR spectrum gives the following peaks: 210.3; 165.2; 71.0; 62.8; 56.4; 14.0; 13.6.

Example 1.7

Synthesis of the Ethyl α-(O-phenylethylxanthyl)-α-phenylthiopropionate Precursor 20 ml of acetone and 5.58 g of potassium O-phenylethylxanthate are introduced into a round-bottomed flask. The mixture is homogenized with stirring and under a stream of nitrogen, then the temperature is lowered to 0° C.

A solution of ethyl α-chloro-α-phenylthiopropionate (6.15 g) in acetone (20 ml) is added to the flask drop by drop. The mixture is stirred for 2 hours.

Next, the solvent is evaporated. The residue is diluted with ether, washed firstly with water and then with a saturated aqueous solution of NaCl. The organic phase is separated and dried on sodium sulphate.

The product is recovered in the form of white crystals after evaporation and recrystallization in ether at room temperature.

The $^{13}$C NMR spectrum gives the following peaks: 211.27; 168.82; 130.42; 69.72; 62.13; 25.56; 13.80; 13.37.

Example 1.8

Synthesis of the Ethyl α-(O-phenylethylxanthyl)-α-phenylethanoate Precursor 1 equivalent of phenylethyl alcohol (16.78 ml) in solution in 150 ml of THF is introduced into a round-bottomed flask after which is added 1 equivalent of NaH (5.68 g) at 0° C.

After 2 hours of stirring, 1 equivalent of $CS_2$ (8.48 ml) is added.

After stirring overnight at room temperature, the solution is filtered. The salt is washed with pentane and then dried. It is isolated quantitatively in the form of a yellow powder, 1.09 g of which are dissolved in 5 ml of acetone. The solution is cooled to 0° C.

1 equivalent (0.99 g) of ethyl α-chlorophenylethanoate is added. The solution is stirred for 3 hours at room temperature.

Next, it is extracted with ether, dried on magnesium sulphate and concentrated in vacuo.

1.62 g of ethyl α-(O-phenylethylxanthyl)-α-phenylethanoate is recovered. The overall reaction yield is 90%.

Example 1.9

Synthesis of the (O-ethylxanthyl)isobutyronitrile Precursor 10 ml of bis(O-ethyl)xanthate (2.42 g) is dissolved in 36 ml of hexane in a 100 ml round-bottomed flask provided with a refrigerant and under an inert atmosphere of argon.

The solution is heated for 15 min and then 1 equivalent of azobis(isobutyronitrile) (AIBN) (1.64 g) is added. 0.5 equivalent of AIBN (0.82 g) is added after two and a half hours.

The solution is dried under vacuum. The product is purified by chromatography and isolated. The yield is 77%.

Example 1.10

Synthesis of the Ethyl (O-neopentylxanthyl) malonate Precursor 1 equivalent of neopentyl alcohol (2.15 ml) in solution in 30 ml of THF is introduced into a round-bottomed flask. 1 equivalent of NaH (0.81 g) is then added at 0° C.

After two hours of stirring, 1 equivalent of $CS_2$ (1.21 ml) is added.

After stirring overnight at room temperature, the solution is filtered. The salt is washed with pentane and then dried. It is isolated quantitatively in the form of a yellow powder, 1.86 g of which is dissolved in 10 ml of acetone. The solution is cooled to 0° C.

1 equivalent of ethylchloromalonate (1.61 ml) in 5 ml of acetone is added. The solution is stirred for 4 hours at room temperature. It is then hydrolysed and extracted with ether. It is then dried on magnesium sulphate and concentrated in vacuo.

After purification by chromatography, 2.08 g of product is isolated. The yield is 65%.

Example 1.11

Synthesis of the Ethyl (O-isobornylxanthyl) malonate Precursor 15.4 g of isoborneol in solution in 200 ml of THF are introduced into a round-bottomed flask. The solution is treated with 1 equivalent of NaH at 0° C. then, after 2 hours of stirring, 6 ml of $CS_2$ are added.

The solution is stirred overnight at room temperature and then filtered. The salts are then washed with ether. The filtrate is concentrated. It is taken up in pentane and filtered. Finally, it is dried in order to obtain the sodium salt quantitatively.

5.04 g of this salt are dissolved in 40 ml of acetone. The solution is cooled to 0° C. 3.08 ml of ethylchloromalonate are added. The solution is stirred for one hour at 0° C. Next, it is hydrolysed, extracted with ether and then dried on magnesium sulphate and concentrated in vacuo.

After purification by chromatography on silica, 5.92 g of product are obtained. The yield is 80%.

Example 1.12

Synthesis of the (O-isopropylxanthyl)valeronitrile Precursor 0.336 g of azobisvaleronitrile and 0.27 g of bis(O-isopropyl)xanthate are dissolved in dioxane. The temperature is raised to 101° C.

After 12 hours of stirring, the solvent is evaporated and the residue purified by chromatography on silica.

The product is obtained with a 60% yield.

Example 2

Synthesis of the Precursors of Formula (II) (Homopolymers)

Example 2.1

Styrene Homopolymer 1 mmol of ethyl α-(O-ethylxanthyl)propionate (0.222 g) and 40 mmol of styrene (4.16 g) are introduced into a 10 ml round-bottomed flask. The temperature is raised to 125° C. and 0.03 mmol of lauroyl peroxide (12.8 mg) are added.

The polymerization lasts 9 hours, after which several additions of initiator are made:

0.02 mmol after two hours,
0.02 mmol after four hours,
0.01 mmol after six hours,
0.01 mmol after eight hours.

The polymer is recovered by precipitation in methanol and analysed by GPC in a THF medium and in polystyrene equivalents (see Table 9).

Example 2.2

Styrene Homopolymer 1 mmol of [1-(O-ethylxanthyl)ethyl]benzene (0.226 g) and 40 mmol of styrene (4.16 g) are introduced into a 10 ml round-bottomed flask. The temperature is raised to 90° C. and 0.02 mmol of lauroyl peroxide (8.52 mg) are added.

The polymerization lasts 12 hours, during which several additions of initiator are made:

0.01 mmol after two hours,
0.01 mmol after four hours,
0.01 mmol after six hours,
0.01 mmol after eight hours,
0.01 mmol after ten hours.

The polymer is recovered by precipitation in methanol and analysed by GPC in a THF medium and in polystyrene equivalents (see Table 9).

Example 2.3

Styrene Homopolymer 1 mmol of α,α'-di(O-ethylxanthyl)-p-xylene (0.346 g) and 40 mmol of styrene (4.16 g) are introduced into a 10 ml round-bottomed flask. The temperature is raised to 90° C. and 0.02 mmol of lauroyl peroxide (8.52 mg) are added.

The polymerization lasts 15 hours, during which several additions of initiator are made:

0.01 mmol after two hours,
0.01 mmol after four hours,
0.01 mmol after six hours,
0.01 mmol after eight hours,
0.01 mmol after twelve hours,
0.01 mmol after fourteen hours.

The polymer is recovered by precipitation in methanol and analysed by GPC in a THF medium and in polystyrene equivalents (see Table 9).

Example 2.4

Styrene Homopolymer 1 mmol of α-(O-ethylxanthyl)-α-phthalimidoacetophenone (0.385 g) and 40 mmol of styrene (4.16 g) are introduced into a 10 ml round-bottomed flask. The temperature is raised to 90° C. and 0.02 mmol of lauroyl peroxide (8.52 mg) are added.

The polymerization lasts 15 hours, during which several additions of initiator are made:

0.01 mmol after two hours,
0.01 mmol after four hours,
0.01 mmol after six hours,
0.01 mmol after eight hours,
0.01 mmol after twelve hours,
0.01 mmol after fourteen hours.

The polymer is recovered by precipitation in methanol and analysed by GPC in a THF medium and in polystyrene equivalents (see Table 9).

Example 2.5

Styrene Homopolymer 1 mmol of ethyl α-(O-ethylxanthyl)-α-phenylthiopropionate (0.33 g) and 40 mmol of styrene (4.16 g) are introduced into a 10 ml round-bottomed flask. The temperature is raised to 90° C. and 0.02 mmol of lauroyl peroxide (8.52 mg) are added.

The polymerization lasts 15 hours, during which several additions of initiator are made:

0.01 mmol after two hours,
0.01 mmol after four hours,
0.01 mmol after six hours,
0.01 mmol after eight hours,
0.01 mmol after twelve hours,
0.01 mmol after fourteen hours.

The polymer is recovered by precipitation in methanol and analysed by GPC in a THF medium and in polystyrene equivalents (see Table 9).

Example 2.6

Methyl Acrylate Homopolymer 1 mmol of ethyl α-(O-ethylxanthyl)propionate (0.222 g), 40 mmol of methyl acrylate (MeA) (3.44 g) and 3.5 ml of toluene are introduced into a 10 ml round-bottomed flask. The temperature is raised to 100° C. and 0.035 mmol of lauroyl peroxide (14.9 mg) are added. The polymerization lasts 15 hours, during which several additions of initiator are made:

0.02 mmol after two hours,
0.02 mmol after six hours,
0.02 mmol after ten hours.

The polymer is recovered by evaporating, under high vacuum, the solvent and the traces of residual monomers and is analysed by GPC in THF medium and polystyrene equivalents (see Table 9).

Example 2.7

Methyl Acrylate Homopolymer 1 mmol of ethyl α-(O-ethylxanthyl)propionate (0.222 g) and 40 mmol of methyl acrylate (3.44 g) are introduced into a 10 ml round-bottomed flask. The temperature is raised to 80° C. and 0.03 mmol of lauroyl peroxide (12.8 mg) are added.

The polymerization lasts 45 min.

The polymer is recovered by evaporating, under high vacuum, the solvent and the traces of residual monomers. It is analysed by GPC in THF medium and in polystyrene equivalents (see Table 9).

Example 2.8

Methyl Acrylate Homopolymer 1 mmol of ethyl α-(O-ethylxanthyl)propionate (0.222 g) and 80 mmol of methyl acrylate (6.88 g) are introduced into a 10 ml round-bottomed flask. The temperature is raised to 80° C. and 0.02 mmol of lauroyl peroxide (8.52 mg) are added. The polymerization lasts 45 min.

The polymer is recovered by evaporating, under high vacuum, the traces of residual monomers. It is analysed by GPC in THF medium and in polystyrene equivalents (see Table 9).

Example 2.9

Methyl Acrylate Homopolymer 1 mmol of α-(O-ethylxanthyl)-α-phthalimidoacetophenone (0.385 g) and 40 mmol of methyl acrylate (3.44 g) are introduced into a 10 ml round-bottomed flask. The temperature is raised to 80° C. and 0.02 mmol of lauroyl peroxide (8.52 mg) are added. The polymerization lasts 45 min.

The polymer is recovered by evaporating, under high vacuum, the traces of residual monomers. It is analysed by GPC (see Table 9).

Example 2.10

Ethyl Acrylate Homopolymer 1 mmol of ethyl α-(O-ethylxanthyl)propionate (0.222 g) and 40 mmol of ethyl acrylate (EtA) (3.44 g) are introduced into a 10 ml round-bottomed flask. The temperature is raised to 80° C. and 0.02 mmol of lauroyl peroxide (8.52 mg) are added. The polymerization lasts 6 hours.

The polymer is recovered by evaporating, under high vacuum, the traces of residual monomers. It is analysed by GPC in THF medium and in polystyrene equivalents (see Table 9).

Example 2.11

Methyl Acrylate Homopolymer 1 mmol of ethyl α-(O-ethylxanthyl)-α-phenylthiopropionate (0.33 g) and 40 mmol of methyl acrylate (3.44 g) are introduced into a 10 ml round-bottomed flask. The temperature is raised to 80° C. and 0.02 mmol of lauroyl peroxide (8.52 mg) are added.

The polymerization lasts 6 hours.

The polymer is recovered by evaporating, under high vacuum, the traces of residual monomers. It is analysed by GPC in THF medium and in polystyrene equivalents (see Table 9).

Example 2.12

2-Ethylhexyl Acrylate Homopolymer 1 mmol of ethyl (O-ethylxanthyl)malonate (0.28 g) and 40 mmol of 2-ethylhexyl acrylate (2EHA) (7.36 g) are introduced into a 10 ml round-bottomed flask. The temperature is raised to 80° C. and 0.02 mmol of lauroyl peroxide (8.52 mg) are added.

The polymerization lasts 6 hours.

The polymer is recovered by evaporating, under high vacuum, the traces of residual monomers. It is analysed by GPC in THF medium and in polystyrene equivalents (see Table 9).

Example 2.13

Vinyl Acetate Homopolymer 1 mmol of ethyl α-(O-ethylxanthyl)propionate (0.222 g) and 40 mmol of vinyl acetate (VA) (3.44 g) are introduced into a 10 ml round-bottomed flask. The temperature is raised to 80° C. and 0.02 mmol of lauroyl peroxide (8.52 mg) are added.

The polymerization lasts 8 hours, during which several additions of initiator are made:

0.01 mmol after two hours,
0.01 mmol after four hours,
0.01 mmol after six hours.

The polymer is recovered by evaporating, under high vacuum, the traces of residual monomers and analysed by GPC in THF medium and in polystyrene equivalents (see Table 9).

Example 2.14

Vinyl Acetate Homopolymer 1 mmol of ethyl α-(O-ethylxanthyl)propionate (0.222 g) and 40 mmol of vinyl acetate (3.44 g) are introduced into a 10 ml round-bottomed flask. The temperature is raised to 80° C. and 0.02 mmol of lauroyl peroxide (8.52 mg) are added.

The polymerization lasts 4 hours.

The polymer is recovered by evaporating, under high vacuum, the traces of residual monomers. It is analysed by GPC in THF medium and in polystyrene equivalents (see Table 9).

Example 2.15

Styrene Homopolymer 1 mmol (3.8 g) of the polymer from Example 2.1, chain-end functionalized by the O-ethylxanthyl group, and 40 mmol of styrene (4.16 g) are introduced into a 10 ml round-bottomed flask. The temperature is raised to 90° C. and 0.02 mmol of lauroyl peroxide (8.52 mg) are added.

The polymerization lasts 10 hours, during which several additions of initiator are made:

0.01 mmol after two hours,
0.01 mmol after four hours,
0.01 mmol after six hours,
0.01 mmol after eight hours.

The polymer is recovered by precipitation in methanol and analysed by GPC in THF medium and in polystyrene equivalents (see Table 9).

This polymer is a styrene homopolymer, but it was obtained as a diblock copolymer with two polystyrene blocks.

Example 2.16

Styrene Homopolymer

The following are introduced into a 2 l reactor:

0.4 g of sodium bicarbonate,
5.4 g of sodium lauryl sulphate, and
1020 g of water.

The temperature is increased to 85° C.

An aqueous ammonium persulphate solution (1.6 g of water+0.8 g of ammonium persulphate) is added.

A mixture containing 400 g of styrene and 2.22 g of ethyl α-(O-ethylxanthyl)propionate is added continuously over a period of 2 hours.

The temperature is maintained at 85° C. for an additional 1 hour, during which an aqueous ammonium persulphate solution (0.8 g of water+0.4 g of ammonium persulphate) is introduced.

The polymer obtained is recovered after coagulation of the emulsion and analysed by GPC in THF medium and in polystyrene equivalents (see Table 9).

Example 2.17

Styrene Homopolymer 1 mmol of ethyl (O-ethylxanthyl)malonate (0.28 g) and 40 mmol of styrene (4.16 g) are introduced into a 10 ml round-bottomed flask. The temperature is raised to 95° C. and 0.03 mmol of lauroyl peroxide (12.8 mg) are added.

The polymerization lasts 10 hours, during which several additions of initiator are made:

0.02 mmol after two hours,
0.02 mmol after four hours,
0.02 mmol after six hours,
0.02 mmol after eight hours.

The polymer is recovered by precipitation in methanol.

It is analysed by GPC in THF medium and in polystyrene equivalents (see Table 9).

Example 2.18

Methyl Acrylate Homopolymer 1 mmol of ethyl (O-ethylxanthyl)malonate (0.28 g) and 40 mmol of methyl acrylate (3.44 g) are introduced into a 10 ml round-bottomed flask containing 4 ml of toluene. The temperature is raised to 80° C. and 0.03 mmol of lauroyl peroxide (12.8 mg) are added.

The polymerization lasts 26 hours, during which 0.02 mmol of lauroyl peroxide are added every two hours.

The polymer is recovered by evaporating, under high vacuum, the toluene and the traces of residual monomer.

It is analysed by GPC in THF medium and in polystyrene equivalents (see Table 9).

Example 2.19

Styrene Homopolymer 1 mmol of ethyl α-(O-phenylethyl)-α-phenylthiopropionate (0.406 g) and 40 mmol of styrene (4.16 g) are introduced into a 10 ml round-bottomed flask. The temperature is raised to 95° C. and 0.03 mmol of lauroyl peroxide (12.8 mg) are added.

The polymerization lasts 16 hours, during which 0.02 mmol of lauroyl peroxide are added every two hours.

The polymer is recovered by precipitation in methanol.

It is analysed by GPC in THF medium and in polystyrene equivalents (see Table 9).

Example 2.20

Methyl Acrylate Homopolymer 1 mmol of ethyl α-(O-phenylethylxanthyl)-α-phenylethanoate (0.36 g) and 40 mmol of methyl acrylate (3.44 g) are introduced into a 10 ml round-bottomed flask. The temperature is raised to 80° C. and 0.03 mmol of lauroyl peroxide (12.8 mg) are added.

The polymerization lasts 11 hours, during which 0.02 mmol of lauroyl peroxide are added every two hours.

The polymer is recovered by evaporating, under high vacuum, the traces of residual monomer.

It is analysed by GPC in THF medium and in polystyrene equivalents (see Table 9).

Example 2.21

Methyl Acrylate Homopolymer 1 mmol of (O-ethylxanthyl)isobutyronitrile (0.189 g) and 40 mmol of methyl acrylate (3.44 g) are introduced into a 10 ml round-bottomed flask. The temperature is raised to 80° C. and 0.03 mmol of lauroyl peroxide (12.8 mg) are added.

The polymerization lasts 6 hours, during which 0.02 mmol of lauroyl peroxide are added every two hours, after 2 and 4 hours.

The polymer is recovered by evaporating, under high vacuum, the traces of residual monomers.

It is analysed by GPC in THF medium and in polystyrene equivalents (see Table 9).

Example 2.22

Methyl Acrylate Homopolymer 1 mmol of ethyl (O-neopentylxanthyl)malonate (0.322 g) and 40 mmol of methyl acrylate (3.44 g) are introduced into a 10 ml round-bottomed flask. The temperature is raised to 80° C. and 0.03 mmol of lauroyl peroxide (12.8 mg) are added.

The polymerization lasts 4 hours, during which 0.02 mmol of lauroyl peroxide are added after two hours.

The polymer is recovered by evaporating, under high vacuum, the traces of residual monomer.

It is analysed by GPC in THF medium and in polystyrene equivalents (see Table 9).

Example 2.23

Methyl Acrylate Homopolymer 1 mmol of ethyl (O-isobornylxanthyl)malonate (0.388 g) and 40 mmol of methyl acrylate (3.44 g) are added to a 10 ml round-bottomed flask. The temperature is raised to 80° C. and 0.03 mmol of lauroyl peroxide (12.8 mg) are added.

The polymerization lasts 2 hours 30 minutes during which 0.02 mmol of lauroyl peroxide are added after 2 hours.

The polymer is recovered by evaporating, under high vacuum, the traces of residual monomer.

It is analysed by GPC in THF medium and in polystyrene equivalents (see Table 9).

Example 2.24

Vinyl Acetate Homopolymer 1 mmol of ethyl (O-isobornyl)malonate (0.388 g) and 77 mmol of vinyl acetate (6.62 g) are introduced into a 10 ml round-bottomed flask. The temperature is raised to 70° C. and 0.01 mmol of AIBN (azobisisobutyronitrile) (1.64 mg) are added. The polymerization lasts 24 hours, during which several additions of AIBN are made:

1.4 mg after two hours, 2.2 mg after four hours.

The polymer is recovered by evaporating, under high vacuum, the traces of residual monomers.

It is analysed by GPC in THF medium and in polystyrene equivalents (see Table 9).

Example 2.25

Acrylic Acid Homopolymers 25 g of acrylic acid are dissolved in 85 g of water and then the solution thus obtained is neutralized to a pH between 6 and 7: this solution is solution 1.

0.35 g of 2,2'-azobis(2-methylpropionamide) dihydrochloride are dissolved in 150 g of water: this solution is solution 2.

Into three round-bottomed flasks, each containing a different quantity of (O-isopropylxanthyl)valeronitrile, are introduced 11 g of solution 1 and 1.5 g of solution 2. The compositions of the various flasks are shown in Table A.

The temperature is raised to 70° C. and polymerization is carried out over 24 hours.

The polymer is recovered by evaporating, under high vacuum, the water and the traces of residual monomer.

It is analysed by GPC in aqueous medium and in PEO equivalents, the results being given in Table 1.

TABLE 1

| Mass of precursor (g) | Degree of conversion (%) | $M_n$ | PI |
| --- | --- | --- | --- |
| 0.065 | 100 | 14,800 | 1.7 |
| 0.108 | 100 | 12,000 | 1.4 |
| 0.163 | 100 | 8,900 | 1.4 |

Example 2.26

Acrylic Acid Homopolymer 1 mmol of ethyl α-(O-ethylxanthyl)propionate (0.222 g) and 40 mmol of acrylic acid (2.88 g) are introduced into a 10 ml round-bottomed flask. The temperature is raised to 80° C. and 0.04 mmol of lauroyl peroxide (17 mg) are added.

The polymerization lasts 6 hours, during which several additions of lauroyl peroxide are made:

0.04 mmol after two hours, 0.04 mmol after four hours.

The polymer is recovered by evaporating, under high vacuum, the traces of residual monomer.

It is analysed by GPC in aqueous medium and in PEO equivalents (see Table 9).

Example 2.27

Acrylic Acid Homopolymers

Several acrylic acid homopolymers are prepared in the following manner.

All the acrylic acid (AA), the AIBN and the ethyl α-(O-ethylxanthyl)propionate precursor are mixed together and introduced into a round-bottomed flask. The amounts are given in Table 2. The temperature is raised to 80° C.

The polymerization lasts 6 hours.

The traces of residual monomer are removed by evaporation.

The results, obtained from GPC analysis in THF medium and in polystyrene equivalents, are given in Table 2.

TABLE 2

| AA mass (g) | AIBN mass (mg) | Precursor mass (g) | $M_n$ | PI |
| --- | --- | --- | --- | --- |
| 1.53 | 3.47 | 0.35 | 345 | 1.12 |
| 3.39 | 1.81 | 0.2 | 770 | 1.10 |
| 3.85 | 1.15 | 0.13 | 1060 | 1.25 |
| 4.08 | 0.92 | 0.10 | 1290 | 1.30 |

Example 2.28

Acrylic Acid Homopolymers

Several acrylic acid homopolymers are prepared in solution in the following manner.

All the acrylic acid (AA), the AIBN and the ethyl α-(O-ethylxanthyl)propionate precursor are dissolved in acetone in a round-bottomed flask. The respective amounts of each ingredient are given in Table 3.

The temperature is raised to 60° C.

The polymerization lasts 3 hours.

The traces of residual monomer and the solvent are removed by evaporation.

The results, obtained by GPC analysis in THF medium and in polystyrene equivalents, are given in Table 3.

TABLE 3

| AA mass (g) | AIBN mass (mg) | Precursor mass (g) | Volume of solvent (ml) | $M_n$ | PI |
|---|---|---|---|---|---|
| 5.07 | 2.93 | 0.3 | 8 | 550 | 1.10 |
| 3.88 | 1.12 | 0.12 | 5 | 1170 | 1.19 |
| 4.37 | 0.63 | 0.07 | 5 | 1760 | 1.29 |
| 4.56 | 0.44 | 0.05 | 5 | 1920 | 1.27 |

Example 2.29

Ethyl Acrylate Homopolymer

The following are introduced into a round-bottomed flask:

33.2 mg of ethyl α-(O-ethylxanthyl)propionate (1 equivalent), 5.01 g of ethyl acrylate (160 equivalents), and 8.2 mg of AIBN.

The temperature is raised to 70° C. The polymerization lasts 24 hours.

The polymer is recovered by evaporating, under high vacuum, the traces of residual monomer. It is analysed by GPC in THF medium and in polystyrene equivalents (see Table 9).

Example 2.30

Vinyl Acetate Homopolymer 4.3 g of vinyl acetate and 59.7 mg of lauroyl peroxide are introduced into three round-bottomed flasks containing varying amounts of ethyl α-(O-ethylxanthyl)propionate. The temperature is raised to 70° C. and the polymerization lasts 6 hours. The amounts of precursor used are given in Table 4.

The polymer is recovered by evaporating, under high vacuum, the traces of residual monomer. The results, obtained by GPC analysis in THF medium and in polystyrene equivalents, are given in Table 4.

TABLE 4

| Mass of precursor (g) | Degree of conversion (%) | $M_n$ | PI |
|---|---|---|---|
| 0.266 | 64.4 | 2100 | 1.4 |
| 0.130 | 66.6 | 4100 | 1.6 |
| 0.068 | 66.0 | 7000 | 1.9 |

Example 2.31

Styrene Homopolymer Obtained in Emulsion

The following are introduced into a 1.5 l reactor fitted with a Teflon (PTFE) anchor stirrer:

525 g of water, 0.2 g of sodium hydrogen carbonate and 10 g of sodium lauryl sulphate.

The temperature is raised to 70° C. and 20 g of styrene and all of the ethyl α-(O-ethylxanthyl)propionate precursor are added in one go.

Next, the temperature is increased to 85° C. and 0.4 g of ammonium persulphate in solution in 16.13 g of water are added in one go.

Styrene (180 g) is then continuously fed in over a period of four hours.

The temperature is maintained at 85° C. for an additional 2 hours.

The results, obtained from GPC analysis in THF medium and in polystyrene equivalents, are given in Table 5.

TABLE 5

| Mass of precursor (g) | Degree of conversion (%) | $M_n$ | PI |
|---|---|---|---|
| 2 | 88 | 15,400 | 1.9 |
| 1 | 90 | 29,500 | 1.9 |

Example 2.32

Styrene Homopolymer Obtained in Emulsion

The following are introduced into a 1.5 l reactor fitted with a Teflon (PTFE) anchor stirrer:

475 g of water, 0.2 g of sodium hydrogencarbonate and 10 g of sodium lauryl sulphate.

The temperature is raised to 70° C. and the following are added in one go:

20 g of styrene and 2 g of ethyl α-(O-ethylxanthyl)propionate.

Next, the temperature is increased to 85° C. and 0.4 g of ammonium persulphate in solution in 16.13 g of water are added in one go.

The following are introduced into the reactor, continuously and simultaneously:

180 g of styrene over 8 hours, 0.4 g of ammonium persulphate in 50.4 g of water over 10 hours.

Specimens are removed regularly and analysed by GPC in THF medium and in polystyrene equivalents. The results obtained are given in Table 6.

TABLE 6

| Time (h) | Degree of conversion (%) | $M_n$ | PI |
|---|---|---|---|
| 1 | 10.1 | 2500 | 1.8 |
| 2 | 18.6 | 3300 | 1.8 |
| 4 | 39.2 | 6250 | 1.9 |
| 6 | 56.3 | 8100 | 1.9 |
| 8 | 73.3 | 10,000 | 1.9 |
| 24 | 75.7 | 10,500 | 1.9 |

A linear increase in the molecular masses with conversion is observed, thereby demonstrating the controlled character of the radical polymerization.

Example 2.33

Ethyl Acrylate Homopolymer

A solution is prepared which contains:

17.64 g of ethyl acrylate;

0.459 g of ethyl α-(O-ethylxanthyl)propionate and 0.036 g of AIBN.

1 g of this solution is introduced into 7 tubes which will serve to determine the polymerization kinetics.

These tubes are then heated to 70° C. and stopped at different times. For each tube, the polymer is recovered by evaporating the traces of residual monomer and analysed by GPC in THF medium and in polystyrene equivalents.

The results obtained are given in Table 7.

TABLE 7

| Time (min) | Degree of conversion (%) | $M_n$ | PI |
|---|---|---|---|
| 12 | 0 | 1900 | 3.4 |
| 21 | 17 | 4200 | 2.5 |
| 30 | 32.3 | 4300 | 2.5 |
| 42 | 43.5 | 4800 | 2.4 |
| 53 | 46.6 | 4800 | 2.5 |
| 66 | 71.4 | 6700 | 1.9 |
| 124 | 80.4 | 7100 | 1.9 |

A linear increase in the molecular masses with conversion is observed, thereby demonstrating the controlled character of the radical polymerization.

Example 2.34

Vinyl Acetate Homopolymer

A solution is prepared which contains:

7.35 g of vinyl acetate, 0.229 g of ethyl α-(O-ethylxanthyl)propionate, and 0.018 g of AIBN.

1 g of this solution is introduced into 4 tubes which will serve to determine the polymerization kinetics.

The tubes are then heated to 70° C. and stopped at different times. For each tube, the polymer is recovered by evaporating the traces of residual monomer and analysed by GPC in THF medium and in polystyrene equivalents.

The results obtained are given in Table 8.

TABLE 8

| Time (min) | Degree of conversion (%) | $M_n$ | PI |
|---|---|---|---|
| 12 | 0 | | |
| 28 | 13.8 | 1200 | 1.4 |
| 38 | 77.8 | 4300 | 1.7 |
| 51 | 83.9 | 4300 | 1.7 |

A linear increase in the molecular masses with conversion is observed, thereby demonstrating the controlled character of the radical polymerization.

Results of Examples 2.1 to 2.24, 2.26 and 2.29

GPC analysis of the homopolymers obtained above is used to measure their number-average mass ($M_n$). It is also used to measure their weight-average mass ($M_w$) and hence their polydispersity index (PI) corresponding to the ratio of $M_w$ to $M_n$.

GPC chromatograms are systematically produced in double detection mode, namely refractometry (RI) and UV absorption (UV). The UV detection wavelength corresponds to the maximum absorption of the xanthate functional group fixed on the end of the chain according to the formula claimed. For all the specimens analysed, there is perfect superposition of the chromatograms obtained from one or other detection mode. This result indicates that the chain ends are functionalized and constitutes an additional proof of the assumed structure of the polymers according to the invention.

TABLE 9

| Examples | Monomer | $M_n$ | PI | Degree of conversion |
|---|---|---|---|---|
| Ex. 2.1 | styrene | 3800 | 2 | |
| Ex. 2.2 | styrene | 5200 | 2.1 | |
| Ex. 2.3 | styrene | 7900 | 2.5 | |
| Ex. 2.4 | styrene | 3200 | 1.8 | |
| Ex. 2.5 | styrene | 3300 | 1.9 | |
| Ex. 2.6 | MeA | 3500 | 1.8 | |
| Ex. 2.7 | MeA | 3750 | 1.7 | |
| Ex. 2.8 | MeA | 7300 | 1.7 | |
| Ex. 2.9 | MeA | 3000 | 1.4 | |
| Ex. 2.10 | EtA | 3700 | 1.6 | |
| Ex. 2.11 | MeA | 3500 | 1.35 | |
| Ex. 2.12 | 2EHA | 6900 | 1.5 | |
| Ex. 2.13 | VA | 3200 | 1.35 | |
| Ex. 2.14 | VA | 2100 | 1.18 | |
| Ex. 2.15 | styrene | 6200 | 2 | |
| Ex. 2.16 | styrene | 3800 | 1.6 | |
| Ex. 2.17 | styrene | 4300 | 1.9 | 78 |
| Ex. 2.18 | MeA | 3900 | 1.5 | 95 |
| Ex. 2.19 | styrene | 3400 | 1.8 | 77 |
| Ex. 2.20 | MeA | 3100 | 1.6 | 60 |
| Ex. 2.21 | MeA | 3600 | 1.4 | 75 |
| Ex. 2.22 | MeA | 5100 | 1.4 | 90 |
| Ex. 2.23 | MeA | 4000 | 1.7 | 88 |
| Ex. 2.24 | VA ? | 2500 | 1.8 | 29 |
| Ex. 2.26 | AA | 6600 | 2.3 | 97 |
| Ex. 2.29 | EtA | 29,400 | 1.9 | 93 |

Example 2.35

Vinyl Acetate Homopolymer

The following are introduced into a 10 ml round-bottomed flask:

0.899 g of vinyl acetate (i.e. approximately 10 equivalents), 0.220 g of ethyl α-(O-ethylxanthylpropionate (1 equivalent), and 17.2 mg of AIBN.

The temperature is raised to 70° C. The polymerization lasts 24 hours.

The polymer is recovered by evaporating, under high vacuum, the traces of residual monomer and is analysed by MALDI-TOF on a DHB (dihydroxybenzoic acid) matrix. The results are given in Table 10.

TABLE 10

| Number of VA units | Theoretical mass (g) | MALDI-TOF mass (g) |
|---|---|---|
| 7 | 833 | 831.556 |
| 8 | 919 | 917.458 |
| 9 | 1005 | 1003.638 |

In Table 10, the theoretical masses are calculated assuming a structure according to the formula:

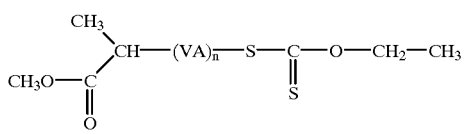

It is necessary to add 23 g to the mass obtained since the species detected are in sodium salt form. The excellent agreement between the theoretical masses and the masses measured by MALDI-TOF confirm the assumed mechanism for the polymerization and the structure of the polymers obtained.

Examples 3

Synthesis of Block Copolymers

Example 3.1 p(MeA-b-St) Block Copolymer

The following are introduced into a 10 ml round-bottomed flask:

1 mmol of ethyl α-(O-ethylxanthyl)propionate (0.222 g) and 20 mmol of methyl acrylate (1.72 g).

The mixture is heated to 80° C. and 0.02 mmol of lauroyl peroxide (8.52 mg) are added. The mixture is maintained at temperature for 45 min after which it coagulates. Next, the reaction mixture is dissolved in 3 ml of toluene and then evaporated to dryness, in vacuo. This operation is repeated three times in order to remove the traces of residual methyl acrylate. This synthesis results in a precursor which can be used for preparing a block copolymer.

Next, 20 mmol of styrene (2.08 g) are introduced into the reactor. The temperature is raised to 110° C. and 0.02 mmol of lauroyl peroxide (8.52 mg) are added. This second step lasts 6 hours, during which several additions of initiator are made:

0.01 mmol after two hours, 0.01 mmol after four hours.

The copolymer obtained is recovered by precipitation in methanol and analysed by double detection GPC—refractometry and UV spectrometry. The GPC solvent is THF and the masses are given in polystyrene equivalents. The results are given in Table 12.

Example 3.2 p(St-b-MeA) Block Copolymer

The following are introduced into a 10 ml round-bottomed flask:

1 mmol of ethyl α-(O-ethylxanthyl)propionate (0.222 g), 20 mmol of styrene (2.08 g), and 1 ml of toluene.

The reaction mixture is raised to 110° C. and 0.025 mmol of lauroyl peroxide (10.6 mg) are introduced into the reactor. This first step lasts 9 hours, during which several additions of initiator are made:

0.01 mmol after two hours, 0.01 mmol after four hours, 0.01 mmol after six hours, 0.01 mmol after eight hours.

Next, the mixture is cooled to 80° C. and the following are introduced:

20 mmol of methyl acrylate (1.72 g) and 0.03 mmol of lauroyl peroxide (12.8 mg).

This second step lasts 7 hours, during which several additions of initiator are made:

0.01 mmol after two hours, 0.01 mmol after four hours, 0.01 mmol after six hours.

The polymer obtained is recovered and analysed as in Example 3.1. The results are given in Table 11.

Example 3.3 p(St-b-MeA) Block Copolymer

The following are introduced into a 10 ml round-bottomed flask:

1 mmol of [1-(O-ethylxanthyl)ethyl]benzene (0.226 g) and 20 mmol of styrene (2.08 g).

The temperature is raised to 90° C. and 0.03 mmol of lauroyl peroxide (12.8 mg) are added. The temperature is maintained at 90° C. for 10 hours, during which several additions of initiator are made:

0.01 mmol after two hours, 0.01 mmol after four hours, 0.01 mmol after six hours, 0.01 mmol after eight hours.

Next, the reaction mixture is cooled to 80° C. and the following are introduced:

20 mmol of methyl acrylate (1.72 g) and 0.02 mmol of lauroyl peroxide (8.52 mg).

This second step lasts 8 hours, during which several additions of initiator are made:

0.01 mmol after two hours, 0.01 mmol after four hours, 0.01 mmol after six hours, 0.01 mmol after seven hours.

The polymer obtained is recovered and analysed as in Example 3.1. The results are given in Table 12.

Example 3.4 p(St-b-MeA-b-St) Block Copolymer

The following are introduced into a 10 ml round-bottomed flask:

1 mmol of [1-(O-ethylxanthyl)ethyl]benzene (0.226 g) and 20 mmol of styrene (2.08 g).

The temperature is raised to 90° C. and 0.03 mmol of lauroyl peroxide (12.8 mg) are added. The temperature is maintained at 90° C. for 10 hours, during which several additions of initiator are made:

0.01 mmol after two hours, 0.01 mmol after four hours, 0.01 mmol after six hours, 0.01 mmol after eight hours.

Next, the reaction mixture is cooled to 80° C. and the following are introduced:

20 mmol of methyl acrylate and 0.02 mmol of lauroyl peroxide.

This second step lasts 8 hours, during which several additions of initiator are made:

0.01 mmol after two hours, 0.01 mmol after four hours, 0.01 mmol after six hours, 0.01 mmol after seven hours.

The temperature is again raised to 90° C. and the following are introduced:

20 mmol of styrene (2.08 g) and 0.02 mmol of lauroyl peroxide.

This third step lasts 8 hours, during which several additions of initiator are made:

1 mmol after two hours, 1 mmol after four hours, 1 mmol after six hours.

The polymer obtained is recovered and analysed as in Example 3.1. The results are given in Table 12.

Example 3.5 p(MeA-b-St) Block Copolymer

The following are introduced into a round-bottomed flask:

1 mmol of [1-(O-ethylxanthyl)ethyl]benzene (0.226 g) and 20 mmol of methyl acrylate (1.72 g).

The temperature is raised to 80° C. and 0.02 mmol of lauroyl peroxide are added. This first step lasts 8 hours, during which several additions of initiator are made:

1 mmol after two hours, 1 mmol after four hours, 1 mmol after six hours.

Next, the temperature is increased to 90° C. and the following are introduced:

20 mmol of styrene and 0.02 mmol of lauroyl peroxide; This second step lasts 14 hours, during which several additions of initiator are made:

0.01 mmol after two hours, 0.01 mmol after four hours, 0.01 mmol after six hours, 0.01 mmol after eight hours, 0.01 mmol after ten hours, 0.01 mmol after twelve hours.

The polymer obtained is recovered and analysed as in Example 3.1. The results are given in Table 12.

Example 3.6 p(EtA-b-VA) Block Copolymer

The following are introduced into a round-bottomed flask:

1.881 g of ethyl acrylate, 0.111 g of ethyl α-(O-ethylxanthyl)propionate and 8.6 mg of lauroyl peroxide.

The temperature is raised to 80° C. The polymerization lasts 6 hours, during which several additions of lauroyl peroxide are made:

9.2 mg after 2 hours, 9.0 mg after 4 hours.

After cooling, the traces of residual ethyl acrylate are removed by evaporation under high vacuum and a small fraction of the polymer is taken for GPC analysis in THF medium and in polystyrene equivalents. The results are as follows:

degree of conversion: 98.3%

$M_n$=2800

PI=1.8.

Next, 1.853 g of vinyl acetate and 8.6 mg of lauroyl peroxide are introduced into the flask. The temperature is raised to 80° C. The polymerization lasts 6 hours, during which several additions of lauroyl peroxide are made:

8.6 mg after 2 hours, 8.5 mg after 4 hours.

The traces of residual vinyl acetate are removed by evaporation under high vacuum. The results are given in Table 12.

Example 3.7 p(EtA-b-tBuA) Block Copolymer

The following are introduced into a round-bottomed flask:

1.881 g of ethyl acrylate, 0.111 g of ethyl α-(O-ethylxanthyl)propionate and 9.0 mg of lauroyl peroxide. The temperature is raised to 80° C. The polymerization lasts 6 hours, during which several additions of lauroyl peroxide are made:

8.6 mg after 2 hours, 8.9 mg after 4 hours.

After cooling, the traces of residual ethyl acrylate are removed by evaporation under high vacuum and a small fraction of the polymer is taken to be analysed by GPC in THF medium and in polystyrene equivalents:

degree of conversion: 98.6%

$M_n$=2600

PI=1.9.

Next, the following are introduced into the flask:

2.7467 g of tert-butyl acrylate and 8.5 mg of lauroyl peroxide.

The temperature is raised to 80° C. The polymerization lasts 6 hours, during which several additions of lauroyl peroxide are made:

8.7 mg after 2 hours, 8.5 mg after 4 hours.

The traces of residual tert-butyl acrylate are removed by evaporation under high vacuum and the copolymer obtained is analysed by GPC in THF medium and in polystyrene equivalents. The results are given in Table 12.

Example 3.8 p(t-BuA-b-VA) Block Copolymer

The following are introduced into a round-bottomed flask:

2.737 g of tert-butyl acrylate, 0.111 g of ethyl α-(O-ethylxanthyl)propionate and 8.7 mg of lauroyl peroxide.

The temperature is raised to 80° C. The polymerization lasts 6 hours, during which several additions of lauroyl peroxide are made:

8.9 mg after 2 hours, 8.9 mg after 4 hours.

After cooling, the residual traces of tert-butyl acrylate are removed by evaporation under high vacuum and a small fraction of the polymer is taken to be analysed by GPC in THF medium and in polystyrene equivalents:

degree of conversion: 98.3%, $M_n$=2500,

PI=2.4.

Next, the following are introduced into the flask:

1.851 g of vinyl acetate and 8.5 mg of lauroyl peroxide.

The temperature is raised to 80° C. The polymerization lasts 6 hours, during which several additions of lauroyl peroxide are made:

8.7 mg after 2 hours, 8.5 mg after 4 hours.

The traces of residual vinyl acetate are removed by evaporation under high vacuum and the copolymer obtained is analysed by GPC in THF medium and in polystyrene equivalents. The results are given in Table 12.

Example 3.9 p(tBuA-b-EtA) Block Copolymer

The following are introduced into a round-bottomed flask:

2.737 g of tert-butyl acrylate, 0.111 g of ethyl α-(O-ethylxanthyl)propionate and 8.4 mg of lauroyl peroxide.

The temperature is raised to 80° C. The polymerization lasts 6 hours, during which several additions of lauroyl peroxide are made:

9.0 mg after 2 hours, 8.7 mg after 4 hours.

After cooling, the residual traces of tert-butyl acrylate are removed by evaporation under high vacuum and a small fraction of the polymer is taken to be analysed by GPC in THF medium and in polystyrene equivalents:

degree of conversion: 98.1%, $M_n$=2500,

PI=2.5.

Next, the following are introduced into the flask:

1.896 g of ethyl acrylate and 8.8 mg of lauroyl peroxide.

The temperature is raised to 80° C. The polymerization lasts 6 hours, during which several additions of lauroyl peroxide are made:

8.7 mg after 2 hours, 8.5 mg after 4 hours.

The traces of residual ethyl acrylate are removed by evaporation under high vacuum and the copolymer obtained is analysed by GPC in THF medium and in polystyrene equivalents. The results are given in Table 12.

Example 3.10 p(EtA-b-St) Block Copolymer

The following are introduced into a round-bottomed flask:

1.881 g of ethyl acrylate, 0.111 g of ethyl α-(O-ethylxanthyl)propionate and 8.8 mg of lauroyl peroxide.

The temperature is raised to 80° C. The polymerization lasts 6 hours, during which several additions of lauroyl peroxide are made:

9.0 mg after 2 hours, 8.5 mg after 4 hours.

After cooling, the residual traces of ethyl acrylate are removed by evaporation under high vacuum and a small fraction of the polymer is taken to be analysed by GPC in THF medium and in polystyrene equivalents:

degree of conversion: 97.5%, $M_n$=3000,

PI=1.8.

Next, the following are introduced into the flask:

2.231 g of styrene and 9.0 mg of lauroyl peroxide.

The temperature is raised to 115° C. The polymerization lasts 6 hours, during which several additions of lauroyl peroxide are made:

8.7 mg after 2 hours, 9.9 mg after 4 hours.

The traces of residual styrene are removed by evaporation under high vacuum and the copolymer obtained is analysed by GPC in THF medium and in polystyrene equivalents. The results are given in Table 12.

Example 3.11 p(tBuA-b-St) Block Copolymer

The following are introduced into a round-bottomed flask:

2.737 g of tert-butyl acrylate, 0.111 g of ethyl α-(O-ethylxanthyl)propionate and 9.0 mg of lauroyl peroxide.

The temperature is raised to 80° C. The polymerization lasts 6 hours, during which several additions of lauroyl peroxide are made:

8.5 mg after 2 hours, 9.6 mg after 4 hours.

After cooling, the residual traces of tert-butyl acrylate are removed by evaporation under high vacuum and a small fraction of the polymer is taken to be analysed by GPC in THF medium and in polystyrene equivalents:

degree of conversion: 98.4%, $M_n$=2800,

PI=2.4.

Next, the following are introduced into the flask:

2.246 g of styrene and 8.4 mg of lauroyl peroxide.

The temperature is raised to 115° C. The polymerization lasts 6 hours, during which several additions of lauroyl peroxide are made:

9.2 mg after 2 hours, 9.2 mg after 4 hours.

The traces of residual styrene are removed by evaporation under high vacuum and the copolymer obtained is analysed by GPC in THF medium and in polystyrene equivalents. The results are given in Table 12.

Example 3.12 p(EtA-b-tBuA-b-St) Block Copolymer

The following are introduced into a round-bottomed flask:

2.248 g of styrene, the entire copolymer obtained in Example 3.7 and 8.3 mg of lauroyl peroxide.

The temperature is raised to 115° C. The polymerization lasts 6 hours, during which several additions of lauroyl peroxide are made:

9.0 mg after 2 hours, 8.5 mg after 4 hours.

The traces of residual styrene are removed by evaporation under high vacuum and the copolymer obtained is analysed by GPC in THF medium and in polystyrene equivalents. The results are given in Table 12.

Example 3.13 p(St-b-EtA) Block Copolymer

The following are introduced into a round-bottomed flask:

2.224 g of styrene, 0.111 g of ethyl α-(O-ethylxanthyl)propionate and 8.6 mg of lauroyl peroxide.

The temperature is raised to 115° C. The polymerization lasts 6 hours, during which several additions of lauroyl peroxide are made:

8.7 mg after 2 hours, 8.3 mg after 4 hours.

After cooling, the traces of residual styrene are removed by evaporation under high vacuum and a small fraction of the polymer is taken to be analysed by GPC in THF medium and in polystyrene equivalents:

degree of conversion: 98.0%

$M_n$=3500,

PI=2.2.

Next, the following are introduced into the flask:

2 ml of toluene, 1.892 ? of ethyl acrylate and 8.5 mg of lauroyl peroxide.

The temperature is raised to 80° C. The polymerization lasts 6 hours, during which several additions of lauroyl peroxide are made:

9.4 mg after 2 hours, 9.2 mg after 4 hours.

The traces of residual ethyl acrylate are removed by evaporation under high vacuum and the copolymer obtained is analysed by GPC in THF medium and in polystyrene equivalents. The results are given in table 12.

Example 3.14 p(St-b-tBuA) Block Copolymer

The following are introduced into a round-bottomed flask:

2.224 g of styrene, 0.111 g of ethyl α-(O-ethylxanthyl)propionate and 8.6 mg of lauroyl peroxide.

The temperature is raised to 115° C. The polymerization lasts 6 hours, during which several additions of lauroyl peroxide are made:

8.7 mg after 2 hours, 9.5 mg after 4 hours.

After cooling, the traces of residual styrene are removed by evaporation under high vacuum and a small fraction of the polymer is taken to be analysed by GPC in THF medium and in polystyrene equivalents:

degree of conversion: 97.2%

$M_n$=3400,

PI=2.2.

Next, the following are introduced into the flask:

2 ml of toluene, 2.747 g of tert-butyl acrylate and 9.3 mg of lauroyl peroxide.

The temperature is raised to 80° C. The polymerization lasts 6 hours, during which several additions of lauroyl peroxide are made:

8.7 mg after 2 hours, 9.3 mg after 4 hours.

The traces of residual tert-butyl acrylate are removed by evaporation under high vacuum and the copolymer obtained is analysed by GPC in THF medium and in polystyrene equivalents. The results are given in table 12.

Example 3.15 p(tBuA-b-EtA-b-St) Block Copolymer

The following are introduced into a round-bottomed flask:

2 ml of toluene, 2.229 g of styrene, the entire copolymer obtained in Example 3.9 and 9.1 mg of lauroyl peroxide.

The temperature is raised to 120° C. The polymerization lasts 6 hours, during which several additions of lauroyl peroxide are made:

8.5 mg after 2 hours, 8.5 mg after 4 hours.

The traces of residual styrene are removed by evaporation under high vacuum and the copolymer obtained is analysed by GPC in THF medium and in polystyrene equivalents. The results are given in Table 12.

Example 3.16 p(BuA-b-PVA) Block Copolymers (PVA: polyvinyl alcohol)

These copolymers are obtained by hydrolysing their p(BuA-b-VA) equivalents.

A series of p(BuA-b-VA) block copolymers is prepared. All the copolymers are obtained according to the following general operating method.

The following are introduced into a round-bottomed flask:

butyl acrylate (BuA), ethyl α-(O-ethylxanthyl)propionate and approximately one third of the total amount of lauroyl peroxide necessary for this first step.

The temperature is raised to 80° C. The polymerization lasts 6 hours, during which two additions of initiator are made after 2 and 4 hours. Each of the additions corresponds to approximately one third of the total amount of lauroyl peroxide of the first step.

The traces of residual butyl acrylate are removed by evaporation and a small fraction of the polymer is taken to be analysed.

Next, the following are added to the flask:

vinyl acetate and approximately one third of the total amount of lauroyl peroxide necessary for this second step.

The temperature is again raised to 80° C. The polymerization lasts 6 hours and the rest of the initiator is added in the same way as for the synthesis of the first block. The block copolymer is recovered after evaporating the traces of residual vinyl acetate and analysed by GPC in THF medium and in polystyrene equivalents.

The amounts of ingredients used for each of the copolymers, as well as the results obtained, are given in Table 11.

TABLE 11

| Polymerization 1 | | | Homo-polymer | | Polymerization 2 | | Block polymer | |
|---|---|---|---|---|---|---|---|---|
| BuA mass (g) | Precursor mass (g) | Perox. mass (mg) | $M_n$ | PI | VA mass (g) | Perox. mass (mg) | $M_n$ | PI |
| 13.713 | 1.126 | 0.257 | 2500 | 1.6 | 13.789 | 0.263 | 4500 | 1.4 |
| 13.695 | 1.125 | 0.257 | 2500 | 1.6 | 18.395 | 0.265 | 5300 | 1.4 |
| 19.158 | 0.791 | 0.347 | 3900 | 2.0 | 6.461 | 0.350 | 5600 | 1.7 |
| 19.157 | 0.798 | 0.360 | 3900 | 2.0 | 12.872 | 0.352 | 7200 | 1.6 |
| 19.242 | 1.568 | 0.370 | 2500 | 1.6 | 6.470 | 0.365 | 3200 | 1.5 |
| 19.295 | 1.568 | 0.371 | 2500 | 1.7 | 12.969 | 0.359 | 4100 | 1.4 |
| 6.71 | 1.067 | 0.246 | 1500 | 1.4 | 22.027 | 0.497 | 5900 | 1.5 |

Next, the block polymers obtained are hydrolysed: they are dissolved in methanol, with 50% solids content, and then a catalytic amount of sodium hydroxide is added and the reaction mixture is heated at 60° C. for 1 hour.

The p(BuA-b-PVA) copolymers are recovered by evaporating the methanol.

Example 3.17 p(AA-b-PVA) Block Copolymer

This copolymer is obtained by hydrolysing the corresponding p(tBuA-b-VA) copolymer.

The following are introduced into a round-bottomed flask:

2.737 g of tert-butyl acrylate,
0.111 g of ethyl α-(O-ethylxanthyl)propionate and
8.5 mg of lauroyl peroxide.

The temperature is raised to 80° C.

The polymerization lasts 6 hours, during which several additions of lauroyl peroxide are made:
9.5 mg after 2 hours,
9.8 mg after 4 hours.

After cooling, the traces of residual tert-butyl acrylate are removed by evaporation under high vacuum.

A small fraction of the polymer is taken to be analysed by GPC in THF medium and in polystyrene equivalents:
degree of conversion: 99.0%,
$M_n=4300$,
PI=1.7.

Next, the following are introduced into the flask:
1.831 g of vinyl acetate and
8.6 mg of lauroyl peroxide.

The temperature is raised to 80° C.

The polymerization lasts 6 hours, during which several additions of lauroyl peroxide are made:
9.2 mg after 2 hours,
9.2 mg after 4 hours.

The traces of residual vinyl acetate are removed by evaporation under high vacuum and the copolymer obtained is analysed by GPC in THF medium and in polystyrene equivalents. The results are given in Table 12.

Next, the copolymer obtained is hydrolysed in the following manner.

The copolymer is introduced into a water/methanol (10 ml/4 ml) mixture. Three drops of 95% sulphuric acid are added so as to obtain a pH of 1. The temperature is raised to 70° C. After 2 hours 15 minutes, 8 ml of methanol are added and, after 5 hours, three new drops of 95% sulphuric acid are added. This first step lasts 24 hours and enables the poly(tert-butyl acrylate) block to be converted into polyacrylic acid.

Next, the temperature is returned to room temperature and the solvent (water+methanol) is removed by evaporation. The dry residue obtained is redissolved in 30 ml of methanol and a catalytic amount of NaOH is added. The temperature is again raised to 70° C., at which it is maintained for 24 hours.

The polyacrylic acid/polyvinyl alcohol copolymer obtained is recovered by evaporating the methanol.

Example 3.18 p(BuA-b-EtA) Block Copolymer

The following are introduced into a reactor fitted with a stirring system:
60 g of isopropyl acetate,
90 g of butyl acrylate and
6.9 g of ethyl α-(O-ethylxanthyl)propionate.

The temperature is raised to 80° C. 0.18 g of AIBN in solution in 5 g of isopropyl acetate are added in one go.

Fifteen minutes later, a solution containing:
180 g of isopropyl acetate,
274 g of butyl acrylate and
0.5 g of AIBN
is fed continuously over a period of 2 hours.

The temperature and stirring are maintained for 1 hour 45 minutes after the end of adding the first monomer.

A small fraction of the precursor polymer is taken and analysed by GPC in THF medium and in polystyrene equivalents:
$M_n=7000$,
PI=1.9.

A second continuous feed then takes place over a period of 1 hour. It consists of a solution containing:
10 g of isopropyl acetate,
163 g of ethyl acrylate and
0.32 g of AIBN.

The temperature and stirring are maintained for one further hour after the end of adding the second monomer.

The final copolymer is obtained by evaporating the solvent and the traces of residual monomers and is analysed by GPC in THF medium and in polystyrene equivalents. The results are given in Table 12.

Example 3.19 p(BuA-b-EtA) Block Copolymer

The following are introduced into a reactor fitted with a stirring system:
45 g of isopropyl acetate,
75 g of butyl acrylate and
6.9 g of ethyl α-(O-ethylxanthyl)propionate.

The temperature is raised to 80° C. and 0.15 g of AIBN in solution in 5 g of isopropyl acetate are added in one go.

Twenty minutes later, a solution containing:
117 g of isopropyl acetate,
175 g of butyl acrylate and
0.35 g of AIBN
is fed continuously over a period of 1 hour 30 minutes.

The temperature and stirring are maintained for 2 hours 10 minutes after the end of adding the first monomer.

A small fraction of the precursor polymer is taken and analysed by GPC in THF medium and in polystyrene equivalents:
$M_n=5200$
PI=1.8.

A second continuous feed is then carried out over a period of 1 hour 40 minutes. It consists of a solution containing:
168 g of isopropyl acetate,
252 g of ethyl acrylate and
0.5 g of AIBN.

The temperature and stirring are maintained for a further 20 minutes after the end of adding the second monomer.

The final copolymer is recovered by evaporating the solvent and the traces of residual monomers and is analysed by GPC in THF medium and in polystyrene equivalents. The results are given in Table 12.

Results of Examples 3.1 to 3.19

TABLE 12

| | Monomers | | | | | Degree of |
|---|---|---|---|---|---|---|
| Examples | M1 | M2 | M3 | $M_n$ | PI | conversion |
| Ex. 3.1 | MeA | St | — | 4650 | 1.6 | |
| Ex. 3.2 | St | MeA | — | 4300 | 1.7 | |
| Ex. 3.3 | St | MeA | — | 4200 | 1.8 | |
| Ex. 3.4 | St | MeA | St | 6200 | 2 | |
| Ex. 3.5 | MeA | St | — | 3750 | 1.8 | |
| Ex. 3.6 | EtA | VA | — | 5600 | 1.4 | 92.3% |
| Ex. 3.7 | EtA | tBuA | — | 6800 | 1.7 | 97.8% |
| Ex. 3.8 | tBuA | VA | — | 6900 | 1.5 | 83.8% |
| Ex. 3.9 | tBuA | EtA | — | 7000 | 2.0 | 96.1% |

TABLE 12-continued

| | Monomers | | | | Degree of |
|---|---|---|---|---|---|
| Examples | M1 | M2 | M3 | $M_n$ | PI | conversion |
| Ex. 3.10 | EtA | St | — | 7600 | 1.8 | 98.4% |
| Ex. 3.11 | tBuA | St | — | 8100 | 2.9 | 95.9% |
| Ex. 3.12 | EtA | tBuA | St | 13,000 | 2.4 | 97.5% |
| Ex. 3.13 | St | EtA | — | 6200 | 1.9 | >99% |
| Ex. 3.14 | St | tBuA | — | 7100 | 1.9 | >99% |
| Ex. 3.15 | tBuA | EtA | St | 11,400 | 2.4 | >99% |
| Ex. 3.17 | tBuA | VA | — | 7400 | 1.4 | 88% |
| Ex. 3.18 | BuA | EtA | — | 8700 | 2.2 | 95% |
| Ex. 3.19 | Bua | EtA | — | 10,000 | 2.0 | 80% |

What is claimed is:

1. A process for preparing block polymers of general formula (I):

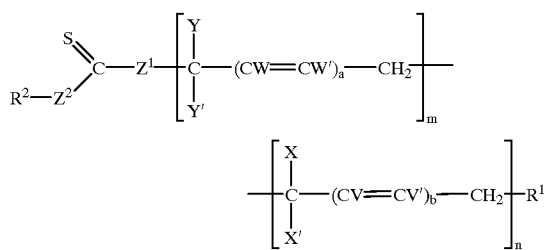

wherein:

$Z^1$=S or P, $Z^2$=O, S or P, $R^1$ and $R^2$, which are identical or different, represent:
an alkyl, acyl, aryl, alkene or alkyne group (i),
an saturated or unsaturated, carbon-containing or aromatic ring (ii),
an saturated or unsaturated heterocycle (iii), V, V', W and W', which are identical or different, represent H, an alkyl group or a halogen, X, X', Y and Y', which are identical or different, represent H, a halogen, $R^3$, $OR^3$, $O_2COR^3$, NHCOH, OH, $NH_2$, $NHR^3$, $N(R^3)_2$, $(R^3)_2N^+O^-$, $NHCOR^3$, $CO_2H$, $CO_2R^3$, CN, $CONH_2$, $CONHR^3$ or $CONR^3{}_2$ group, wherein $R^3$ is alkyl, aryl, aralkyl, alkaryl, alkene or organo-silyl groups, optionally perfluorinated, a and b, which are identical or different, are equal to 0 or 1, m and n, which are identical or different, are greater than or equal to 1 and, when one or other is greater than 1, the individual repeat units are identical or different, said process comprising the step of bringing into contact with each other:

an ethylenically unsaturated monomer of formula: CYY' (=CW—CW')$_a$=CH$_2$, a precursor compound of general formula (II):

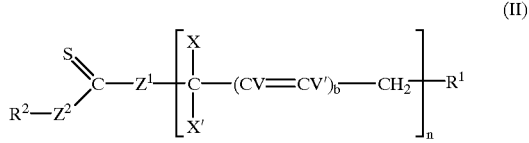

and a radical polymerization initiator.

2. A process according to claim 1, wherein said hydrophilic or ionic group is an alkali metal salt of carboxylic acids, an alkali metal salt of sulphonic acid, a polyethylene oxide chain, a polypropylene oxide chain, a cationic substituent, or a quaternary ammonium salt.

3. A process according to claim 1, wherein the ethylenically unsaturated monomer is styrene, a styrene derivative, butadiene, chloroprene, acrylic ester, methacrylic ester or a vinylnitrile.

4. A process according to claim 3, wherein the ethylenically unsaturated monomer is vinylacetate, vinylversatate, or vinylpropionate.

5. A process according to claim 1, wherein $R^1$ represents:
a group of formula $CR'^1R'^2R'^3$, wherein $R'^1$, $R'^2$ and $R'^3$ represent groups (i), (ii) or (iii), or
a —$COR'^4$ group, wherein $R'^4$ represents a group (i), (ii) or (iii).

6. A process according to claim 1, wherein $R^1$ represents:
a group of formula $CR'^1R'^2R'^3$, wherein $R'^1$=$R'^2$=H and $R'^3$ is an aryl, alkene or alkyne group, or
a —$COR'^4$ group, wherein $R'^4$ represents a group (i), (ii) or (iii).

7. A process according to claim 1, wherein $R^2$ represents a group of formula: —$CH_2R'^5$, in which $R'^5$ represents H or a group (i), (ii) or (iii) with the proviso that $R'^5$ is not an aryl group, an alkyne group, or an alkene group.

8. A process according to claim 1, wherein $Z^1$ is a sulphur atom and $Z^2$ is an oxygen atom.

9. A process according to claim 8, wherein:
$R^1$ is:

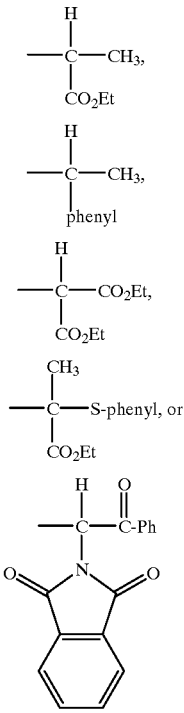

and $R^2$ is an ethyl or phenyl group.

10. A process according to claim 1, wherein the compounds (II) are styrene, methyl acrylate, ethyl acrylate, butyl acrylate, tert-butyl acrylate, vinyl acetate, and an acrylic acid homopolymer, wherein:
$Z^1$=S, $Z^2$=O, $R^1$=CHCH$_3$(CO$_2$Et) and $R^2$=Et, or
$Z^1$=S, $Z^2$=O, $R^1$=CH(CO$_2$Et)$_2$ and $R^2$=Et.

11. A process according to claim 1, wherein the precursor compound of general formula (II) is a polymer and wherein said polymer is made by radical polymerization of an ethylenically unsaturated monomer of formula: CXX'(=CV—CV')$_b$=CH$_2$, comprising the step of bringing into contact said monomer with a radical polymerization initiator and a compound of general formula (III), (IV) or (V):

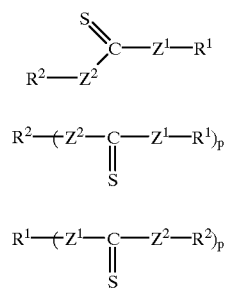

(III)

(IV)

$$R^2-(Z^2-\underset{\underset{S}{\|}}{C}-Z^1-R^1)_p$$

(V)

$$R^1-(Z^1-\underset{\underset{S}{\|}}{C}-Z^2-R^2)_p$$

wherein p is between 2 and 10.

12. A process according to claim 11, wherein the compound (III) is ethyl-α-(O-ethylxanthyl)propionate or ethyl (O-ethylxanthyl)malonate.

13. A process for preparing block polymers, comprising the steps of:

a) preparing a block polymer of general formula (I):

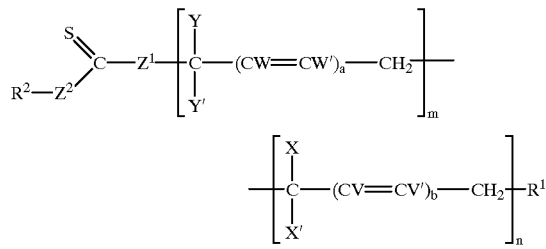

wherein:
$Z^1$=S or P,
$Z^2$=O, S or P,
$R^1$ and $R^2$, which are identical or different, represent:
  an alkyl, acyl, aryl, alkene or alkyne group (i),
  a saturated or unsaturated, carbon-containing or aromatic ring (ii),
  a saturated or unsaturated heterocycle (iii),
V, V', W and W', which are identical or different, represent H, an alkyl group or a halogen,
X, X', Y and Y', which are identical or different, represent H, a halogen, $R^3$, $OR^3$, $O_2COR^3$, NHCOH, OH, NH$_2$, NHR$^3$, N(R$^3$)$_2$, (R$^3$)$_2$N$^+$O$^-$, NHCOR$^3$, CO$_2$H, CO$_2$R$^3$, CN, CONH$_2$, CONHR$^3$ or CONR$^3$$_2$ group, wherein R$^3$ is alkyl, aryl, aralkyl, alkaryl, alkene or organo-silyl groups, optionally perfluorinated
a and b, which are identical or different, are equal to 0 or 1,
m and n, which are identical or different, are greater than or equal to 1 and, when one or other is greater than 1, the individual repeat units are identical or different, said process comprising the step of bringing into contact with each other:
an ethylenically unsaturated monomer of formula: CYY'(=CW—CW')$_a$=CH$_2$, a precursor compound of general formula (II):

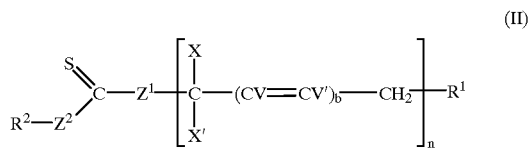

(II)

and a radical polymerization initiator, b) repeating at least one more time step a) except that different monomers from those used in step a) are used, and using, instead of the precursor compound of formula (II), the block polymer obtained in step a).

14. A process according to claim 13, wherein the block polymer so obtained has a polydispersity index of at most 2.

15. A process according to claim 14, wherein the block polymer has a polydispersity index of at most 1.5.

16. A process according to claim 13, wherein the block polymer is of general formula (I) wherein $Z^1$ is a sulphur atom and $Z^2$ is an oxygen atom.

17. A process according to claim 13, wherein the block polymer has at least two polymer blocks selected from the group consisting of
polystyrene/polymethyl acrylate,
polystyrene/polyethyl acrylate,
polystyrene/poly(tert-butyl acrylate),
polyethyl acrylate/polyvinyl acetate,
polybutyl acrylate/polyvinyl acetate,
polyethyl acrylate/poly(tert-butyl acrylate),
poly(tert-butyl acrylate)/polyvinyl acetate,
polyethyl acrylate/polybutyl acrylate,
polybutyl acrylate/polyvinyl alcohol, and
polyacrylic acid/polyvinyl alcohol.

18. A process according to claim 1, wherein the block polymer so obtained has a polydispersity index of at most 2.

19. A process according to claim 18, wherein the block polymer has a polydispersity index of at most 1.5.

20. A process according to claim 1, wherein the block polymer is of general formula (I) wherein $Z^1$ is a sulphur atom and $Z^2$ is an oxygen atom.

21. A process according to claim 1, wherein the block polymer has at least two polymer blocks selected from the group consisting of
polystyrene/polymethyl acrylate,
polystyrene/polyethyl acrylate,
polystyrene/poly(tert-butyl acrylate),
polyethyl acrylate/polyvinyl acetate,
polybutyl acrylate/polyvinyl acetate,
polyethyl acrylate/poly(tert-butyl acrylate),
poly(tert-butyl acrylate)/polyvinyl acetate,
polyethyl acrylate/polybutyl acrylate,
polybutyl acrylate/polyvinyl alcohol, and
polyacrylic acid/polyvinyl alcohol.

22. A process according to claim 11, wherein the block polymer so obtained has a polydispersity index of at most 2.

23. A process according to claim 22, wherein the block polymer has a polydispersity index of at most 1.5.

24. A process according to claim 11, wherein the block polymer is of general formula (I) wherein $Z^1$ is a sulphur atom and $Z^2$ is an oxygen atom, and n is greater or equal to 6.

25. A process according to claim 11, wherein the block polymer is of general formula (I), wherein:

$Z^1$=S, $Z^2$=O, $R^1$=CHCH$_3$(CO$_2$Et) and $R^2$=Et, or $Z^1$=S, $Z^2$=O, $R^1$=CH(CO$_2$Et)$_2$ and $R^2$=Et.

26. A process according to claim 11, wherein the block polymer of general formula (I), is styrene, methyl acrylate, ethyl acrylate, butyl acrylate, tert-butyl acrylate, vinyl acetate, and acrylic acid polymers, wherein:

$Z^1$=S, $Z^2$=O, $R^1$=CHCH$_3$(CO$_2$Et) and $R^2$=Et, or $Z^1$=S, $Z^2$=O, $R^1$=CH(CO$_2$Et)$_2$ and $R^2$=Et.

27. A process according to claim 1, wherein the group (i), ring (ii) and heterocycle (iii) are further substituted with a substituted phenyl, substituted aromatic, alkoxycarbonyl, aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, a hydrophilic group or ionic group, wherein R represents an alkyl group, an aryl group, or a polymer chain.

28. A process according to claim 13, wherein the group (i), ring (ii) and heterocycle (iii) are further substituted with a substituted phenyl, substituted aromatic, alkoxycarbonyl, aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, a hydrophilic group or ionic group, wherein R represents an alkyl group, an aryl group, or a polymer chain.

29. A process according to claim 1, wherein R3 is substituted with one or more groups selected from the group consisting of carboxyl, epoxy, hydroxyl, alkoxy, amino, halogen and sulphonic groups.

30. A process according to claim 13, wherein R3 is substituted with one or more groups selected from the group consisting of carboxyl, epoxy, hydroxyl, alkoxy, amino, halogen and sulphonic groups.

* * * * *

Adverse Decision In Interference

Patent No. 6,153,705, Pascale Corpart, Dominique Charmot, Samir Z. Zard, Thibaud Biadatti, Daniel Michelet, METHOD FOR BLOCK POLYMER SYNTHESIS BY CONTROLLED RADICAL POLYMERISATION, Interference No.105,314, final judgment adverse to the patentees rendered, December 12, 2005, as to claims 1-7, 11, 12, 18, 19, 21-23.

*(Official Gazette, March 14, 2006)*